United States Patent
Jang et al.

(10) Patent No.: US 11,596,005 B2
(45) Date of Patent: *Feb. 28, 2023

(54) METHOD AND APPARATUS FOR CONTROLLING UPLINK TIME ALIGNMENT IN BROADBAND WIRELESS COMMUNICATION SYSTEM

(71) Applicant: Samsung Electronics Co., Ltd., Suwon-si (KR)

(72) Inventors: Jaehyuk Jang, Suwon-si (KR); Soenghun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/373,004

(22) Filed: Jul. 12, 2021

(65) Prior Publication Data

US 2021/0345415 A1   Nov. 4, 2021

Related U.S. Application Data

(63) Continuation of application No. 16/408,933, filed on May 10, 2019, now Pat. No. 11,064,528.

(30) Foreign Application Priority Data

May 10, 2018   (KR) .................... 10-2018-0053819

(51) Int. Cl.
*H04W 74/08*   (2009.01)
*H04W 56/00*   (2009.01)
(Continued)

(52) U.S. Cl.
CPC ....... *H04W 74/0833* (2013.01); *H04L 1/0005* (2013.01); *H04L 1/1819* (2013.01);
(Continued)

(58) Field of Classification Search
CPC ............. H04W 74/0833; H04W 76/27; H04W 56/0045; H04W 74/0841; H04L 1/0005; H04L 1/1819; H04L 5/0055; H04L 1/0006
See application file for complete search history.

(56) References Cited

U.S. PATENT DOCUMENTS 9,648,643 B2   5/2017   Dinan
10,420,113 B2  9/2019   Zhang et al.
(Continued)

FOREIGN PATENT DOCUMENTS

EP   0 2 866 373 A1   4/2015
JP   2015/534374 A    11/2015
(Continued)

OTHER PUBLICATIONS

NTT Docomo et al: "Summary of email discussion point 3: Initial access procedure: C-RNTI and HARQ", 3GPP Draft; R2-070263 Point 3 Initial Access, 3rd Generation Partnership Project (3GPP), Mobile Competence Centre ; 650, Route Des Lucioles ; F-06921 Sophia-Antipolis Cedex ; FRANCE, vol. RAN WG2, No. Sorrento, Italy; Jan. 12, 2007, Jan. 12, 2007 (Jan. 12, 2007), XP050133354.
(Continued)

*Primary Examiner* — Mewale A Ambaye
(74) *Attorney, Agent, or Firm* — Jefferson IP Law, LLP

(57) ABSTRACT

A communication technique for convergence of internet of things (IoT) technology, a fifth-generation (5G) communication system for supporting a higher data transfer rate beyond a fourth-generation (4G) system, and a system therefor are provided. The disclosure can be applied to intelligent services (e.g., smart homes, smart buildings, smart cities, smart or connected cars, health care, digital education, retail business, and services associated with security and safety) based on 5G communication technology and IoT-related technology. An embodiment relates to a method
(Continued)

for controlling an uplink time alignment during execution of random access by a base station operating a broadband.

16 Claims, 18 Drawing Sheets

(51) Int. Cl.
*H04W 76/27* (2018.01)
*H04L 5/00* (2006.01)
*H04L 1/00* (2006.01)
*H04L 1/1812* (2023.01)

(52) U.S. Cl.
CPC ....... *H04L 5/0055* (2013.01); *H04W 56/0045* (2013.01); *H04W 76/27* (2018.02)

(56) References Cited

U.S. PATENT DOCUMENTS

| | | | |
|---|---|---|---|
| 2009/0213818 A1 | 8/2009 | Park et al. | |
| 2010/0177747 A1 | 7/2010 | Chun et al. | |
| 2011/0261763 A1 | 10/2011 | Chun et al. | |
| 2011/0310845 A1 | 12/2011 | Jung et al. | |
| 2012/0087328 A1 | 4/2012 | Park et al. | |
| 2012/0257570 A1 | 10/2012 | Jang et al. | |
| 2013/0250902 A1 | 9/2013 | Xu et al. | |
| 2014/0003387 A1 | 1/2014 | Lee et al. | |
| 2014/0036818 A1 | 2/2014 | Koskela et al. | |
| 2014/0036853 A1 | 2/2014 | Kim et al. | |
| 2014/0086161 A1 | 3/2014 | Cai et al. | |
| 2015/0131635 A1 | 5/2015 | Jang et al. | |
| 2015/0296385 A1 | 10/2015 | Zhang et al. | |
| 2016/0088622 A1 | 3/2016 | Dinan | |
| 2017/0094533 A1 | 3/2017 | Wu | |
| 2017/0289818 A1 | 10/2017 | Ng et al. | |
| 2017/0290014 A1 | 10/2017 | Kim et al. | |
| 2018/0049068 A1 | 2/2018 | Agiwal et al. | |
| 2018/0115430 A1 | 4/2018 | Seo | |
| 2018/0242367 A1 | 8/2018 | Kim et al. | |
| 2019/0037637 A1 | 1/2019 | Suzuki et al. | |
| 2019/0190691 A1 | 6/2019 | Kroeger et al. | |
| 2019/0215862 A1* | 7/2019 | Kim | H04W 74/0841 |
| 2019/0296861 A1* | 9/2019 | Zou | H04L 1/1812 |
| 2019/0297549 A1* | 9/2019 | Suzuki | H04W 56/00 |
| 2020/0107356 A1 | 4/2020 | Rico Alvarino et al. | |
| 2020/0170045 A1* | 5/2020 | Lee | H04W 72/042 |
| 2020/0351892 A1* | 11/2020 | Yi | H04W 80/02 |
| 2021/0007171 A1* | 1/2021 | Jeon | H04W 68/005 |
| 2021/0376985 A1* | 12/2021 | Zhou | H04L 5/0053 |

FOREIGN PATENT DOCUMENTS

| | | |
|---|---|---|
| KR | 10-2010-0103352 A | 9/2010 |
| KR | 10-2012-0113667 A | 10/2012 |
| KR | 10-2015-0058501 A | 5/2015 |
| KR | 10-2017-0111965 A | 10/2017 |
| WO | 2010/077122 A2 | 7/2010 |
| WO | 2010/079941 A2 | 7/2010 |
| WO | 2011/050535 A1 | 5/2011 |
| WO | 2017/030412 A1 | 2/2017 |
| WO | 2017/155239 A2 | 9/2017 |

OTHER PUBLICATIONS

Huawei: "UE behaviour after TAT expiry", 3GPP Draft; R2-104846 UE Behavior After a TAT Expiry, 3rd Generation Partnership Project (3GPP), Mobile Competence Centre ; 650, Route Des Lucioles ; F-06921 Sophia-Antipolis Cedex ; France, vol. RAN WG2, No. Madrid, Spain; Aug. 23, 2010, Aug. 17, 2010 (Aug. 17, 2010), XP050451979.

Siemens: "HARQ for msg4 in initial access procedure," 3GPP Draft; R2-063191, 3rd Generation Partnership Project (3GPP), Mobile Competence Centre ; 650, Route Des Lucioles ; F-06921 Sophia-Antipolis Cedex; France, vol. RAN WG2, No. Riga, Latvia; Nov. 1, 2006, Nov. 1, 2006 (Nov. 1, 2006), XP050132690.

Samsung: "TAT stop for SI request". 3GPP Draft; R2-1807542, 3rd Generation Partnership Project (3GPP). Mobile Competence Centre ; 650. Route Des Lucioles ; F-06921 Sophia-Antipolis Cedex; France, vol. RAN WG2. No. Busan. Korea; May 21, 2018-May 25, 2018,May 10, 2018 (May 10, 2018), XP051464148.

Extended European Search Report dated Apr. 26, 2021, issued in European Application No. 19799002.1.

Lenovo et al.,'Maintenance of timing advance at TA timer expiry', R2-1803109, 3GPPTSG RAN WG2 #101, Athens, Greece, Feb. 15, 2018, See pp. 1-2.

International Search Report dated Aug. 13, 2019, issued in International Patent Application No. PCT/KR2019/005624.

Notice of Allowance dated Jun. 21, 2022, issued in Korean Application No. 10-2018-0053819.

Indian Office Action dated Sep. 1, 2022, issued in Indian Application No. 202037048484.

* cited by examiner

METHOD AND APPARATUS FOR CONTROLLING UPLINK TIME ALIGNMENT IN BROADBAND WIRELESS COMMUNICATION SYSTEM

CROSS-REFERENCE TO RELATED APPLICATION(S)

This application is a continuation application of prior application Ser. No. 16/408,933, filed on May 10, 2019, which has issued as U.S. Pat. No. 11,064,528 on Jul. 13, 2021, and was based on and claimed priority under 35 U.S.C. § 119(a) of a Korean patent application number 10-2018-0053819, filed on May 10, 2018, in the Korean Intellectual Property Office, the disclosure of which is incorporated by reference herein in its entirety.

BACKGROUND

1. Field

The disclosure relates to a method and an apparatus for controlling an uplink time alignment in a wireless communication system. More particularly, the disclosure relates to a method and an apparatus for controlling an uplink time alignment in a wireless communication system in third-generation partnership project (3GPP) fifth-generation (5G) new radio (NR) technology.

2. Description of Related Art

To meet the demand for wireless data traffic having increased since deployment of fourth generation (4G) communication systems, efforts have been made to develop an improved 5G or pre-5G communication system. Therefore, the 5G or pre-5G communication system is also called a 'Beyond 4G Network' or a 'Post long-term evolution (LTE) System'. The 5G communication system is considered to be implemented in higher frequency millimeter wave (mm Wave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid frequency shift keying (FSK) and quadrature amplitude modulation (QAM) modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the internet of things (IoT) where distributed entities, such as things, exchange and process information without human intervention. The internet of everything (IoE), which is a combination of the IoT technology and Big Data processing technology through connection with a cloud server, has emerged. As technology elements, such as "sensing technology," "wired/wireless communication and network infrastructure," "service interface technology," and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, MTC, and M2M communication may be implemented by beamforming, MIMO, and array antennas. Application of a cloud RAN as the above-described Big Data processing technology may also be considered to be as an example of convergence between the 5G technology and the IoT technology.

Accordingly, various attempts have been made to apply 5G communication systems to IoT networks. For example, technologies such as a sensor network, M2M communication, and MTC are implemented by techniques such as beamforming, MIMO, and array antennas which are the 5G communication technology. The application of a cloud RAN as the above-described big data processing technology may also be an example of convergence between the 5G technology and the IoT technology.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to define a method for controlling an uplink time alignment related to random access in a next-generation mobile communication system.

Another aspect of the disclosure is to provide a method for minimizing a delay when a neighboring cell is measured and a handover is performed in a wireless communication system which performs beam-based communication.

Additional aspects will be set forth in part in the description which follows and, in part, will be apparent from the description, or may be learned by practice of the presented embodiments.

In accordance with an aspect of the disclosure, a method of a terminal is provided. The method includes transmitting a random access preamble for requesting system information, receiving a random access response message including timing advance (TA) information, transmitting a message for requesting the system information based on the TA information, receiving a first response message, transmitting a hybrid automatic repeat request (HARQ) acknowledgment (ACK) for the first response message, and stopping a timer (timealignmenttimer (TAT)) related to the TA information based on the HARQ ACK.

In accordance with another aspect of the disclosure, a terminal is provided. The terminal includes a transceiver, and at least one processor configured to transmit a random access preamble for requesting system information, receive a random access response message including TA information, transmit a message for requesting the system information based on the TA information, receive a first response message, transmit a hybrid automatic repeat request (HARQ) acknowledgement (ACK) for the first response message, and stop a timer (timealignmenttimer (TAT)) related to the TA information based on the HARQ ACK.

According to various embodiments, a terminal performs random access and then manages an uplink time alignment timer in order to request system information in an RRC_IDLE mode and an RRC_INACTIVE mode, and thus, can run the uplink time alignment timer during execution of random access in order to subsequently access a base station.

Further, according to various embodiments, a terminal quickly acquires beam information on a neighboring cell, and thus can reduce a delay during execution of measurement of a neighboring cell and a handover thereto.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the following description, the terms identifying access nodes, and the terms referring to network entities, messages, interfaces between network entities, and various pieces of identification information are merely examples used for convenience of description. Therefore, the disclosure is not limited to the following terms, and other terms referring to objects having equivalent technical meanings may be used.

Hereinafter, for convenience of description, the disclosure uses terms and names defined in the third-generation partnership project (3GPP) long-term evolution (LTE) standard which is the latest standard among the currently existing communication standards. However, the disclosure is not limited to the terms and names, and may be identically applied to systems complying with other standards. In particular, the disclosure may be applied to 3GPP new radio (NR) which is a fifth-generation (5G) mobile communication standard.

First Embodiment

Figure 1A:
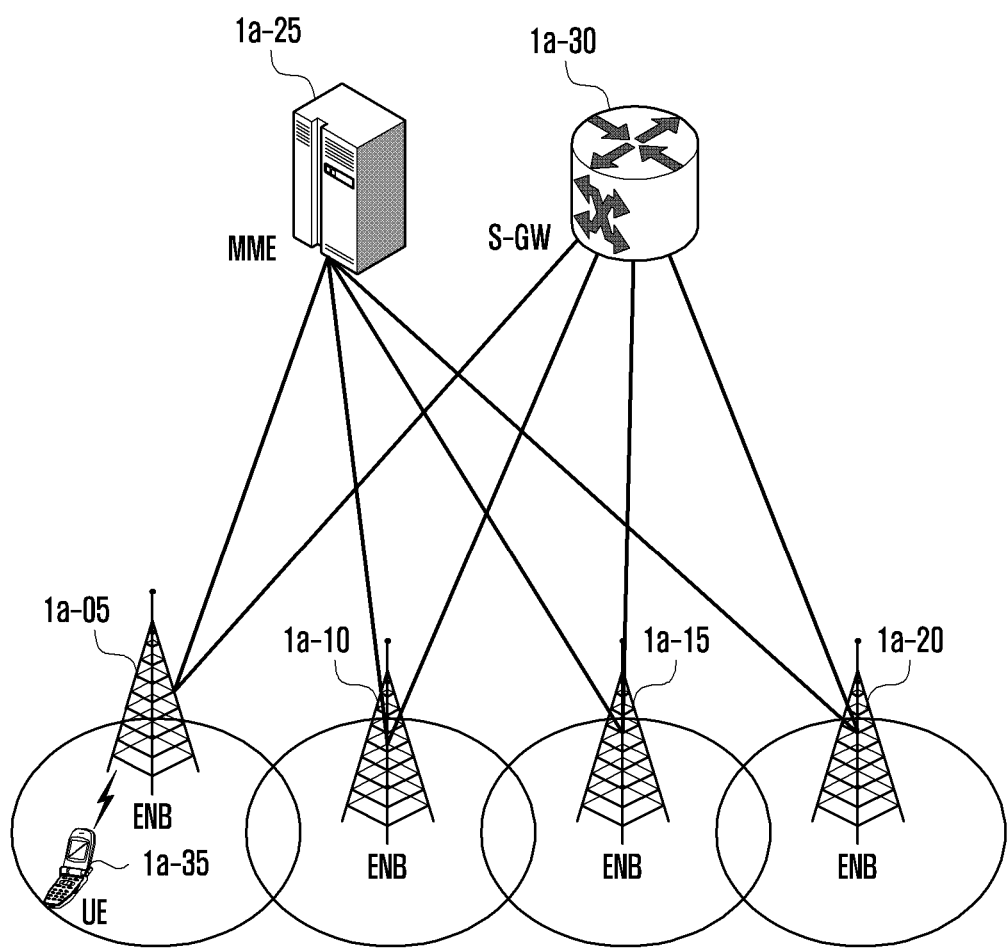
FIG. 1A is a view illustrating an architecture of a long-term evolution (LTE) system according to an embodiment of the disclosure.

FIG. 1A is a view illustrating an architecture of an LTE system according to an embodiment of the disclosure.

Referring to FIG. 1A, the wireless communication system includes base stations 1a-05, 1a-10, 1a-15, and 1a-20, a mobility management entity (MME) 1a-25, and a serving-gateway (S-GW) 1a-30. A user equipment (hereinafter a "UE" or a "terminal") 1a-35 is connected to an external network through the base stations 1a-05, 1a-10, 1a-15, and 1a-20 and the S-GW 1a-30.

The base stations 1a-05, 1a-10, 1a-15, and 1a-20 are access nodes of a cellular network and provide radio access to the terminals connected to the network. That is, in order to serve traffic of users, the base stations 1a-05, 1a-10, 1a-15, and 1a-20 collect and schedule state information such as a buffer state, an available transmission power state, and a channel state of the terminals to support the connection between the terminals and the core network (CN). The MME 1a-25 is an apparatus configured to take charge of various control functions as well as a mobility management function for a terminal and is connected to base stations, and the S-GW 1a-30 is an apparatus configured to provide a data bearer. Further, the MIME 1a-25 and the S-GW 1a-30 may further perform authentication, bearer management, and the like on the terminal connected to the network and may process packets which have been received from the base stations 1a-05, 1a-10, 1a-15, and 1a-20 or are to be delivered to the base stations 1a-05, 1a-10, 1a-15, and 1a-20.

Figure 1B:
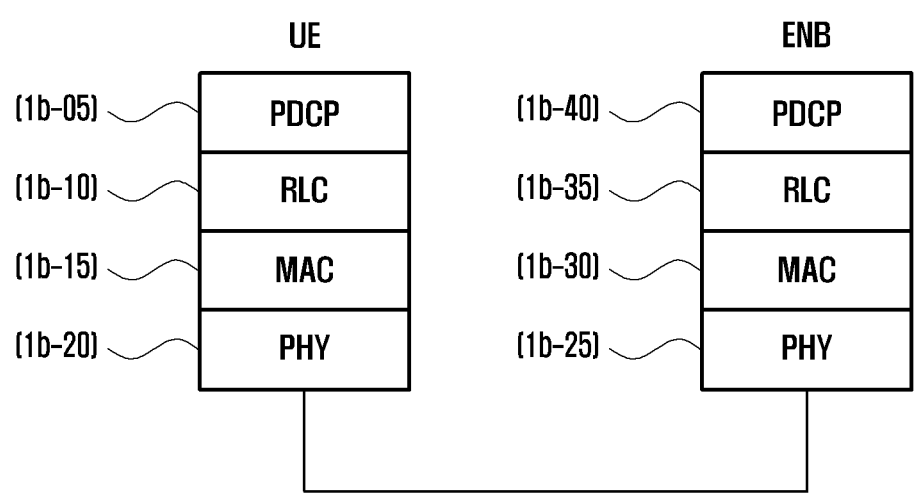
FIG. 1B is a view illustrating a wireless protocol structure in an LTE system according to an embodiment of the disclosure.

FIG. 1B is a view illustrating a wireless protocol structure in an LTE system according to an embodiment of the disclosure.

Referring to FIG. 1B, a wireless protocol of the LTE system includes packet data convergence protocols (PDCPs) 1b-05 and 1b-40, radio link controls (RLCs) 1b-10 and 1b-35, and medium access controls (MACs) 1b-15 and 1b-30 in the terminal and the ENB, respectively. The PDCPs 1b-05 and 1b-40 take charge of operations such as compression/recovery of an IP header, and the RLCs 1b-10 and 1b-35 reconfigure a PDCP packet data unit (PDU) at an appropriate size. The MACs 1b-15 and 1b-30 are connected to multiple RLC layer devices configured in one terminal and perform an operation of multiplexing RLC PDUs in a MAC PDU and demultiplexing the RLC PDUs from the MAC PDU. Physical layers 1b-20 and 1b-25 perform an operation of channel-coding and modulating higher layer data, making the higher layer data as an OFDM symbol and transmitting the same to a radio channel, or demodulating and channel-decoding an OFDM symbol received through the radio channel and delivering the demodulated and channel-decoded OFDM symbol to the higher layer. Further, even the physical layer uses a hybrid automatic repeat request (ARQ) (HARQ) for additional error correction, and a receiving end transmits whether to receive a packet transmitted by a transmitting end by 1 bit. This is called "HARQ acknowledgement (ACK)/negative acknowledgment (NACK) information." Downlink HARQ ACK/NACK information on uplink transmission may be transmitted through a physical hybrid-ARQ indicator channel (PHICH) physical channel, and uplink HARQ ACK/NACK information on downlink transmission may be transmitted through a physical uplink control channel (PUCCH) or physical uplink shared channel (PUSCH) physical channel. Although the PUCCH is generally transmitted in an uplink of a primary cell (PCell) described below, if a terminal provides support, a base station may additionally transmit the PUCCH to the relevant terminal in a secondary cell (SCell) described below, wherein the SCell is called a PUCCH SCell.

Although not illustrated in the drawings, radio resource control (hereinafter, referred to as an "RRC") layers exist at an upper part of the PDCP layer of the terminal and the base station, and the RRC layer may receive and transmit access-and-measurement-related configuration control messages for radio resource control.

The PHY layer may include one or more frequencies/carriers, and technology for simultaneously configuring multiple frequencies and using the simultaneously-configured frequencies is referred to as "carrier aggregation (hereinafter "CA") technology." Unlike using only one carrier for communication between a terminal (or a UE) and a base station (or an E-UTRAN NodeB or eNB), the CA technology uses one or more subcarriers in addition to a main carrier so as to make it possible to dramatically increase a transmission amount by as many as the number of subcarriers. In the LTE, a cell within the base station using the main carrier is referred to as a "primary cell (PCell)" and the subcarrier is referred to as a "secondary cell (SCell)."

Figure 1C:
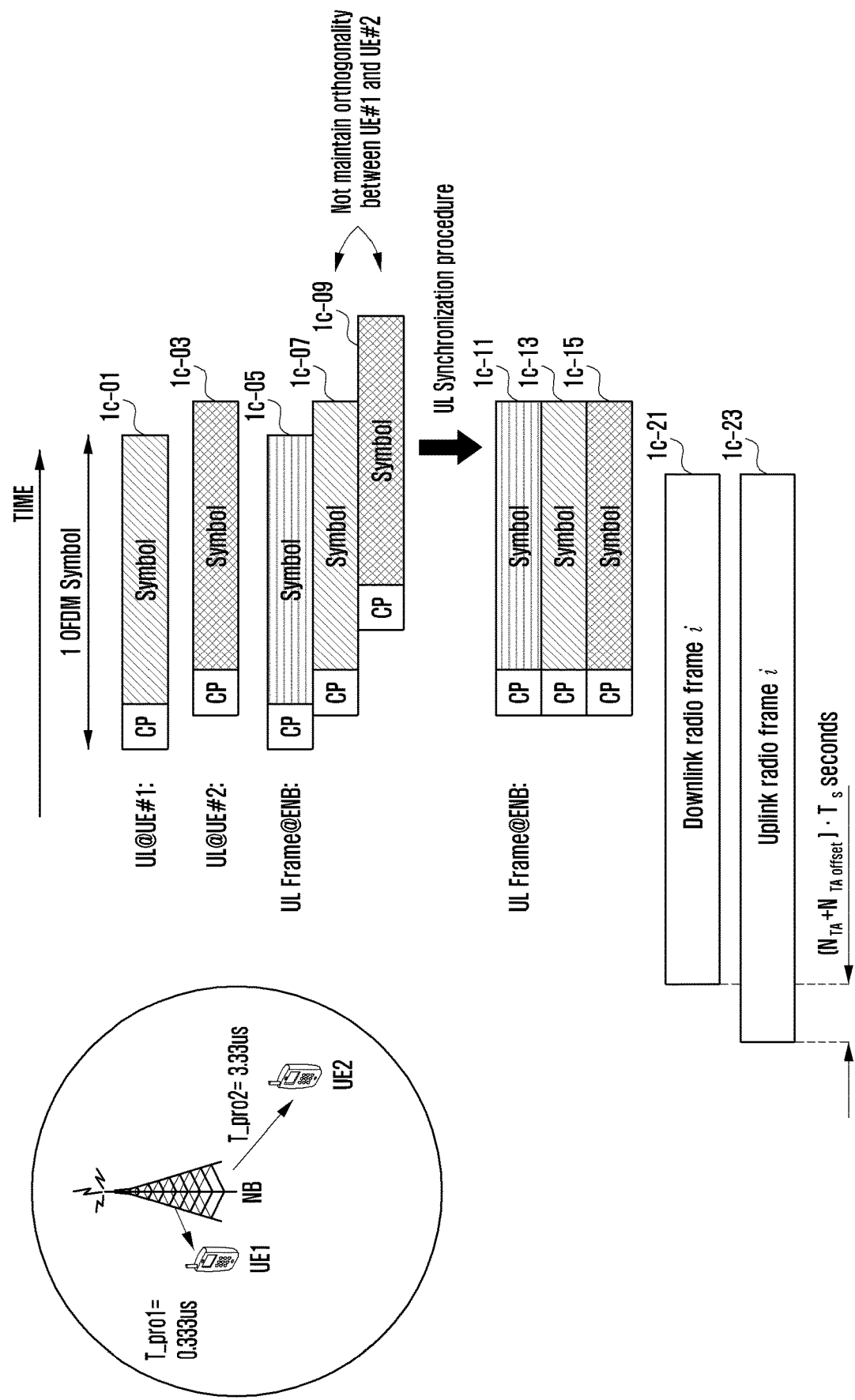
FIG. 1C is a view illustrating the necessity and roles of an uplink timing synchronization procedure in a system to which an orthogonal frequency division multiplexing (OFDM) multiplexing scheme is applied according to an embodiment of the disclosure.

FIG. 1C is a view illustrating the necessity and roles of an uplink timing synchronization (or sync) procedure in a system to which an OFDM multiplexing scheme is applied according to an embodiment of the disclosure.

Referring to FIG. 1C, UE1 denotes a terminal located near an NB (or a base station), and UE2 denotes a terminal located far from the NB.

A first propagation delay time (hereinafter "T_pro1") signifies a propagation delay time in transmission of a wireless signal to the UE1, and a second propagation delay time (hereinafter "T_pro2") signifies a propagation delay time in radio transmission to the UE2.

As illustrated in FIG. 1C, the UE1, because of being located nearer the NB than the UE2, has a shorter propagation delay time (in FIG. 1C, T_pro1 is equal to 0.333 μs and T_pro2 is equal to 3.33 μs).

In a cell of the NB as illustrated in FIG. 1C, if the UE1 and the UE2 are powered on or are in an idle mode, an uplink transmission timing of the UE1 is not synchronized with an uplink transmission timing of the UE2, and uplink transmission timings of UEs in a cell detected by the NB are not synchronized with one another.

Uplink symbol 1c-01 denotes a timing of uplink transmission of the UE1, and uplink symbol 1c-03 denotes a timing of uplink transmission of the UE2. In consideration of propagation delay times of uplink transmissions of the UE1 and the UE2, timings, at which the NB receives uplink signals from the UE1 and the UE2, are denoted by reference numerals 1c-07 and 1c-09, respectively.

That is, a signal that the UE1 has transmitted through the uplink symbol 1c-01 is received by the NB at a timing 1c-07 according to a propagation delay time, and a signal that the UE2 has transmitted through the uplink symbol 1c-03 is received by the NB at a timing 1c-09 according to a propagation delay time.

As illustrated in FIG. 1C, since the timings 1c-07 and 1c-09 precede synchronizing the uplink timing of the UE1 with that of the UE2, a timing 1c-05 when the NB receives a signal through an uplink OFDM symbol and begins to decode the received signal, the timing 1c-07 when the NB receives a signal through an OFDM symbol from the UE1, and the timing 1c-09 when the NB receives a signal through an OFDM symbol from the UE2 may be different from one another.

Accordingly, the uplink signals transmitted by the UE1 and the UE2 do not have orthogonality with respect to each other, thus acting as interference to each other, and the NB fails to successfully decode the uplink signals transmitted by the UE1 and the UE2, due to the interference and the uplink signal reception timings 1c-07 and 1c-09 which are not synchronized with the timing 1c-05.

Therefore, an uplink timing synchronization (or sync) procedure is a process in which the base station synchronizes the reception timings of the uplink signals transmitted by the UE1 and the UE2, and upon completion of the uplink timing synchronization procedure, as indicated by reference numerals 1c-11, 1c-13, and 1c-15, the timing when the NB receives an uplink signal and begins to decodes the received uplink signal, the timing of reception of an uplink signal from the UE1, and the timing of reception of an uplink signal from the UE2 are synchronized with one another. More specifically, the uplink timing synchronization procedure makes it possible to align timings when the base station receives uplink signals, wherein an error in the alignment is within the length of a cyclic prefix (CP), and thus enables the base station to perform decoding.

Through the uplink timing synchronization (sync) procedure, the base station transmits information on which degree of timing that each of the terminals should adjust, by transmitting timing advance (hereinafter, referred to as "TA") information to the terminals. More specifically, the TA information indicates information on how early transmission should be performed relative to a predetermined downlink 1c-21 with reference to the relevant downlink.

In this example, the base station may transmit the TA information through a timing advance command MAC control element (hereinafter, referred to as a "TAC MAC CE") or through a response message (a random access response (hereinafter a "RAR")) to a random access preamble that the terminal has transmitted during execution of random access described below. This configuration may be applied to both the LTE system and the NR system.

For a more detailed description of this configuration, LTE is described by way of example. In the case of an RAR, the TA information has 11 bits (TA=0, 1, 2, . . . , 1282) and thus is calculated by NTA=TA*16. Also, a TAC MAC CE has a 6-bit TA value, and the 6-bit TA value is calculated as a relative value changed according to an existing NTA value (NTA, old). That is, calculation is performed using the following equation: NTA,new=NTA,old+(TA−31)*16. Therefore, an uplink signal is transmitted before (NTA*NTA offset)*Ts with reference to the above-described downlink (as indicated by reference numeral 1c-23).

A value of NTA offset is equal to zero for a frequency division duplex (FDD) system and is equal to 624 for a time division duplex (TDD) system. Also, Ts has a value of 1/(3048*subcarrier spacing). Therefore, the terminal may adjust an uplink transmission time point by using the TA information.

The terminal having received the TA information starts a time alignment timer timeAlignmentTimer (hereinafter, referred to as a "TAT"). The TAT is a timer indicating whether TA is valid. That is, TA is determined to be valid in a period during which the TAT is run, but TA may not be ensured to be valid, after the operation of the TAT is terminated.

If the terminal additionally receives TA information while the TAT is run, the terminal re-starts the TAT, and if the TAT expires after a predetermined period of time, determines that TA information received from the base station is no longer valid, and thus stops uplink communication with the relevant NB.

If the timings are synchronized with one another by using the above-described method, the uplink symbols transmitted by the UE1 and the UE2 may maintain orthogonality, and thus the NB may successfully decode the uplink signals 1c-01 and 1c-03 transmitted by the UE1 and the UE2.

Figure 1D:
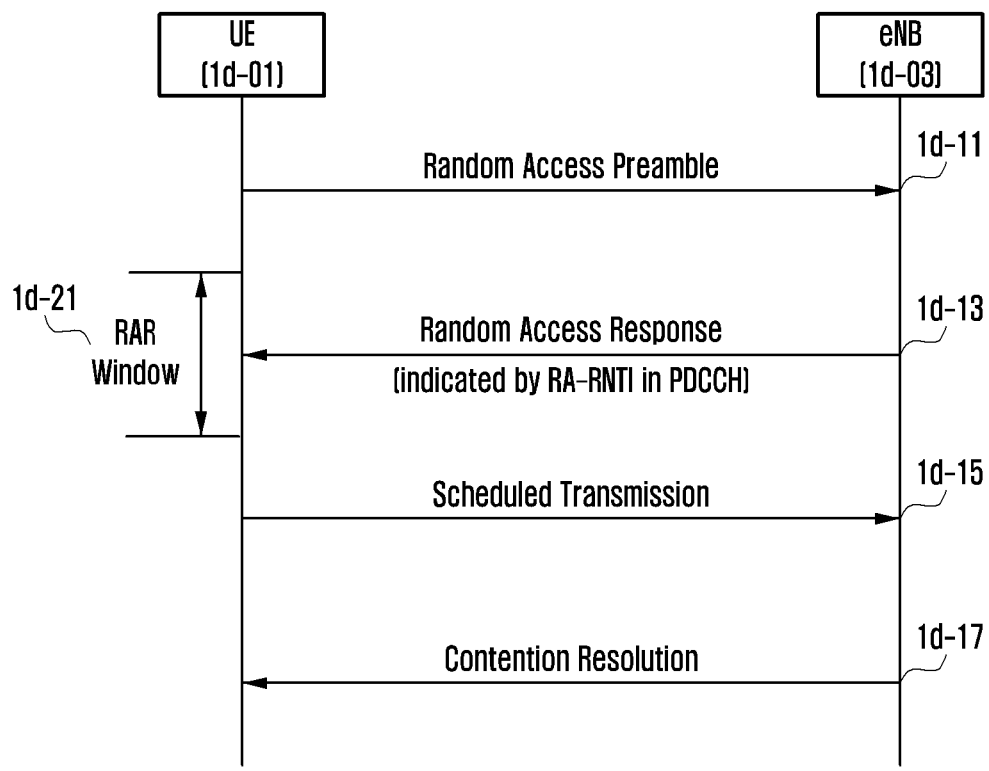
FIG. 1D is a signal flow diagram illustrating a random access procedure according to an embodiment of the disclosure.

FIG. 1D is a signal flow diagram illustrating a random access procedure according to an embodiment of the disclosure.

Referring to FIG. 1D, in various cases where a terminal 1d-01 needs initial access, re-access, a handover, and further, random access to a base station, the terminal 1d-01 performs random access by performing the following procedure.

First, in operation 1d-11, the terminal 1d-01 transmits a random access preamble through a physical channel for random access in order to access a base station 1d-03. The physical channel may be referred to as a "physical random access channel (PRACH)", and one or more terminals may simultaneously transmit random access preambles through a resource of the relevant PRACH. Also, the random access preamble is a particular sequence designed to be received even before the base station is completely synchronized with the terminal, and multiple preamble identifiers (indices) may exist according to standards. If multiple preamble indices exist, the preamble transmitted by the terminal may be a preamble that the terminal has randomly selected, or may be a particular preamble designated by the base station. In the LTE system and the NR system, a total of 64 preamble indices exist.

If the base station receives the preamble, in operation 1d-13, the base station may transmit a random access response (RAR) message to the received preamble to the terminal. The RAR message may include at least one piece of information among index information of the preamble used in operation 1d-11, uplink transmission timing correction information, uplink resource allocation information to be used in subsequent operations (i.e., operation 1d-15 and a message3 (Msg3) transmission operation), and temporary terminal identifier information.

The index information of the preamble is transmitted so as to provide notification of to which preamble the RAR message, which is a response message, responds, for example, when multiple terminals transmit different preambles and thus attempt random accesses in operation 1d-11.

The uplink resource allocation information is information on a resource that the terminal is to use to transmit Msg3 in operation 1d-15, and may include, for example, a physical position and a physical size of the resource, a modulation and coding scheme used during transmission of Msg3, and power adjustment information during transmission of Msg3.

Since, if the terminal having transmitted a preamble initially accesses the base station, the terminal does not have an identifier that the base station has assigned for communication with the base station, the temporary terminal identifier information is value transmitted so as to allow the terminal to use to communicate with the base station.

The RAR message should be transmitted within a predetermined interval after a predetermined period of time from a time point at which the terminal transmits the preamble, and the interval is referred to as a "RAR window" 1d-21. Also, in order to transmit the RAR message, the base station may schedule the relevant RAR message through a PDCCH, and relevant scheduling information may be scrambled using a random access-radio network temporary identifier (RA-RNTI).

The RA-RNTI is mapped to the PRACH resource used to transmit the message in operation 1*d*-11, and the terminal, which has transmitted a preamble through a particular PRACH resource, attempts to receive a PDCCH based on a relevant RA-RNTI so as to determine whether a corresponding RAR message exists. The RAR message includes the following pieces of information:

Uplink resource allocation information described below for transmission of Msg3;

Temporary C-RNTI: if the terminal performs random access in order to transition from an idle mode to a connected mode, after the random access succeeds, identifier information used as a C-RNTI which is a unique identifier in the base station; and TA information (timing advance command): the terminal may perform subsequently-transmitted uplink transmission by adjusting an uplink timing by using TA information.

In operation 1*d*-15, the terminal having received the RAR message may transmit different messages according to various purposes based on uplink resource allocation information included in the RAR message. In the diagram illustrated as an example, the message is a thirdly-transmitted message and may be referred to as an "Msg3" (i.e., the preamble in operation 1*d*-11 may be referred to as an "Msg1" and the RAR in operation 1*d*-13 may be referred to as an "Msg2").

As examples of the Msg3 transmitted by the terminal: in the case of initial access, the terminal may transmit an RRCConnectionRequest message which is a message of an RRC layer; in the case of re-access, the terminal may transmit an RRCConnectionReestablishmentRequest message; and during a handover, the terminal may transmit an RRCConnectionReconfigurationComplete message. Alternatively, a buffer status report (BSR) message for resource request and the like may transmitted as the Msg3.

Then, in operation 1*d*-17, the terminal may receive a contention resolution message as a response to the Msg3 from the base station, and the contention resolution message includes, without any change, the contents, which the terminal has transmitted through the Msg3. Therefore, even when multiple terminals have selected the same preamble in operation 1*d*-11, it is possible to provide notification of to which terminal the contention resolution message responds.

Through the above-described random access procedure, the terminal in an idle mode (or an inactive mode) may request the base station for a system information block (SIB). This configuration is referred to as an "on-demand system information request procedure."

The term "SIB" refers to a message including parameters which can be commonly used by terminals in a cell. For example, a scenario may be configured such that: a very important SIB is periodically broadcasted, but system information and the like having low importance or valid for only some terminals, without being separately and periodically broadcasted, may be transmitted to a terminal only if the relevant terminal makes a request, or may be broadcasted to terminals in a cell.

The above-described very important SIB may be transmitted as a message named "master information block" or "remaining system information" (RMSI or SIB 1). Other pieces of system information may be transmitted as a message named "other system information (or Other SIB)." This configuration may be applied to both a connected state and an idle state, and in order to request system information (SI request) through the above-described random access procedure, an NR base station may assign some preamble indices among the above-described 64 preamble indices, for the purpose of requesting the Other SIB. In this example, the terminal receives a header, which includes only the transmitted preamble index, in the RAR message, and in this example, the procedure is terminated without subsequently transmitting Msg3 and Msg4.

Alternatively, in order to request system information (SI request) through the above-described random access procedure, the base station may not assign a dedicated preamble index. In this example, the terminal randomly transmits a preamble, and after reception of a RAR, transmits information on system information, for which the terminal has requested the base station, using an RRC message as Msg3. Then, if the terminal receives Msg4, the random access procedure is terminated.

In the above-described procedure, if the random access procedure is terminated (i.e., if Msg4 is successfully received), a TAT run according to TA information received through the RAR should no longer be run. This is because the TAT should be in a non-run state in order to utilize TA information of the received RAR while the terminal performs the random access when the terminal subsequently (i.e., after system information is requested through the random access) enters a connected mode from an idle mode or an inactive mode. However, if the run TAT is terminated right after the random access procedure is terminated in the random access performed in order to request the system information, the terminal may not transmit an HARQ ACK for Msg4. That is, the terminal has normally received the Msg4, but the base station fails to receive an acknowledgement message for the transmitted Msg4 and thus fails to know whether the acknowledgement message has been finally transmitted. As a result, the base station may not transmit the relevant requested system information. Therefore, the disclosure proposes a method for solving the above-described problem. Specific details will be described below.

Figure 1E:
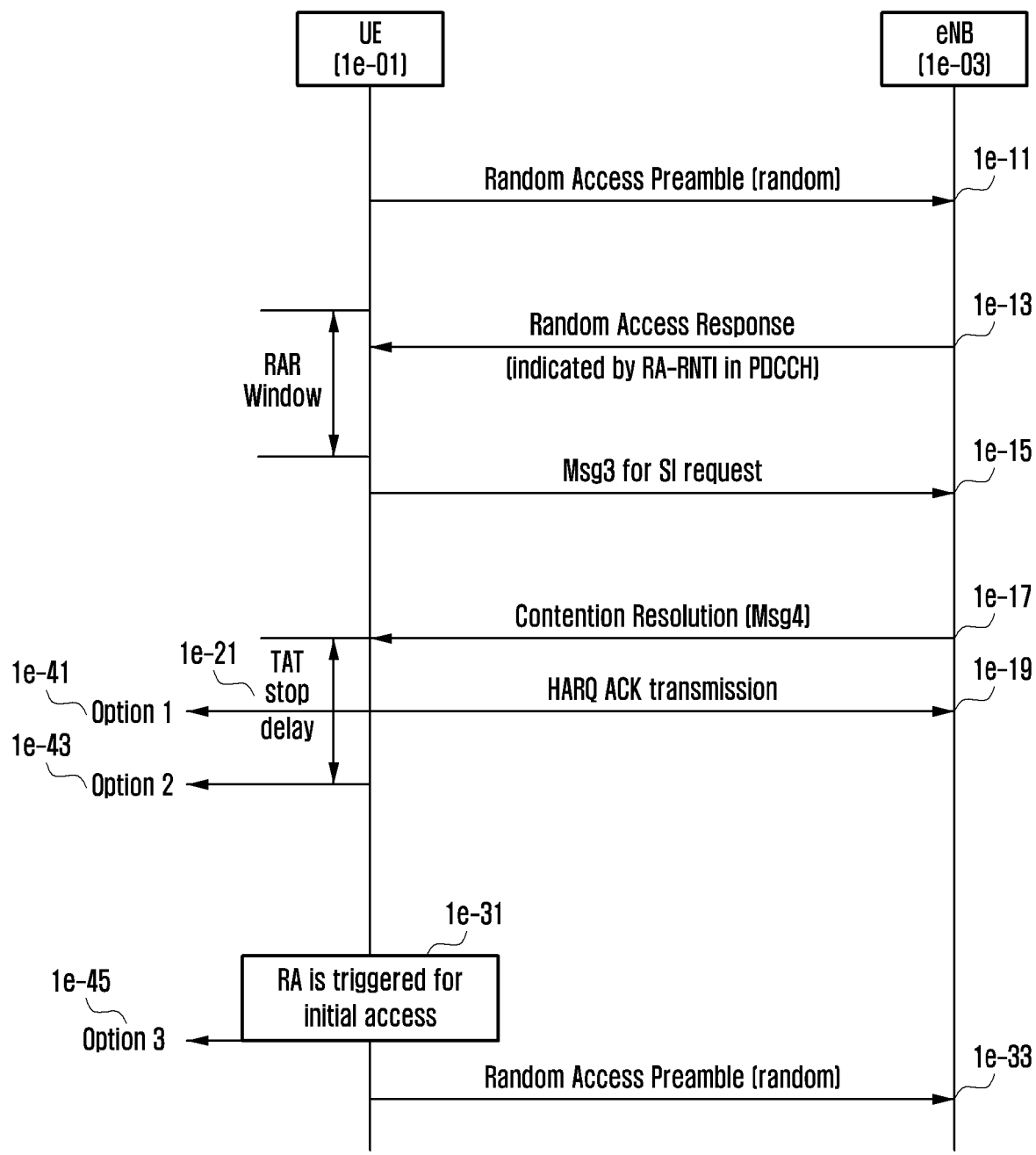
FIG. 1E is a signal flow diagram illustrating operations of a terminal and a base station according to an embodiment of the disclosure.

FIG. 1E is a signal flow diagram illustrating operations of a terminal and a base station according to an embodiment of the disclosure.

Referring to FIG. 1E, a description will be made on the assumption of a state in which the base station does not assign, to the terminal, a dedicated preamble for requesting system information (SI) but the terminal may request SI. Therefore, a description will be made on the assumption of a procedure in which the terminal requests SI through the random access procedure including the four operations described above with reference to FIG. 1D.

In operation 1*e*-11, in order to request a base station 1*e*-03 for SI, a terminal 1*e*-01 in an RRC_IDLE state or an RRC_INACTIVE state may transmit a random access preamble on a PRACH resource. There may occur a case in which one or more terminals simultaneously transmit random access preambles on the PRACH resource. Also, the random access preamble is a particular sequence designed to be received even when the random access preamble is transmitted before the base station is completely synchronized with the terminal, and multiple preambles indices may exist according to standards. If multiple preamble indices exist, the preamble transmitted by the terminal may be a preamble that the terminal has randomly selected, or may be a particular preamble designated by the base station. In the LTE system and the NR system, a total of 64 preamble indices exist. As described above, since this configuration does not correspond to a case in which the base station assigns a dedicated preamble, the preamble may be a resource that the terminal has randomly selected from resources configured by the base station.

If the base station receives the preamble, in operation 1e-13, the base station may transmit an RAR message to the received preamble to the terminal. The RAR message may include index information of the preamble used in operation 1e-11, uplink transmission timing correction information, uplink resource allocation information to be used in subsequent operations (i.e., operation 1e-15), temporary terminal identifier information, and the like.

The index information of the preamble is transmitted so as to provide notification of to which preamble the RAR message, which is a response message, responds, for example, when multiple terminals transmit different preambles and thus attempt random accesses in operation 1e-11.

The uplink resource allocation information is information on a resource that the terminal is to use to transmit Msg3 in operation 1e-15, and may include, for example, a physical position and a physical size of the resource, a modulation and coding scheme used during transmission of Msg3, and power adjustment information during transmission of Msg3.

Since, if the terminal having transmitted a preamble initially accesses the base station, the terminal does not have an identifier that the base station has assigned for communication with the base station, the temporary terminal identifier information is value transmitted so as to allow the terminal to use to communicate with the base station.

The RAR message should be transmitted within a predetermine interval after a predetermined period of time from a time point at which the terminal transmits the preamble, and the interval is referred to as a "RAR window." Also, in order to transmit the RAR message, the base station may schedule the relevant RAR message through a PDCCH, and relevant scheduling information may be scrambled using a RA-RNTI.

The RA-RNTI is mapped to the PRACH resource used to transmit the message in operation 1e-11, and the terminal, which has transmitted a preamble through a particular PRACH resource, attempts to receive a PDCCH based on a relevant RA-RNTI so as to determine whether a corresponding RAR message exists. The RAR message includes the following pieces of information:

Uplink resource allocation information described below for transmission of Msg3;

Temporary C-RNTI: if the terminal performs random access in order to transition from an idle mode to a connected mode, after the random access succeeds, identifier information used as a C-RNTI which is a unique identifier in the base station; and TA information (timing advance command): the terminal may perform subsequently-transmitted uplink transmission by adjusting an uplink timing by using TA information.

The terminal having received the RAR message runs a TAT according to the TA information. Also, in operation 1e-15, the terminal having received the RAR message transmits messages according to various purposes based on uplink resource allocation information included in the RAR message. In the diagram illustrated as an example, the message is a thirdly-transmitted message and may be referred to as an "Msg3" (i.e., the preamble in operation 1e-11 may be referred to as an "Msg1" and the RAR in operation 1e-13 may be referred to as an "Msg2").

As examples of the Msg3 transmitted by the terminal: in the case of initial access, the terminal may transmit an RRCConnectionRequest message which is a message of an RRC layer; in the case of re-access, the terminal may transmit an RRCConnectionReestablishmentRequest message; and during a handover, the terminal may transmit an RRCConnectionReconfigurationComplete message. Alternatively, a BSR message for resource request and the like may transmitted as the Msg3.

In this example, it is assumed that a message of an RRC layer for SI request is transmitted. Accordingly, the base station may receive an SI request from the terminal.

Then, in operation 1e-17, the terminal may receive a contention resolution message Msg4 as a response to the Msg3 from the base station, and the contention resolution message includes, without any change, the contents that the terminal has transmitted through the Msg3 (or includes only upper 48 bits among the contents transmitted through the Msg3). Therefore, even when multiple terminals have selected the same preamble in operation 1e-11, it is possible to provide notification of to which terminal the contention resolution message Msg4 responds.

Then, if the terminal successfully receives Msg4, in operation 1e-19, the terminal transmits an HARQ ACK message. According to an embodiment, the terminal, which has transmitted random access in order to request SI in an idle state, transmits the HARQ ACK message and then stops the TAT run in operation 1e-13, in operation 1e-41. Accordingly, the terminal may transmit an HARQ ACK, and may notify the base station of the reception of the Msg4.

According to another embodiment, after the reception of the Msg4, in operation 1e-43, the terminal stops the TAT run in operation 1e-13 after as much delay as value of a parameter included in SI or a predetermined value defined by the standard (as indicated by reference numeral 1e-21). The predetermined value may be determined by the terminal in consideration of an HARQ retransmission delay (e.g., which is equal to 40 ms if consideration is given to up to five retransmissions when an HARQ retransmission delay of 8 ms is taken into account).

According to still another embodiment, in operation 1e-45, consideration may also be given to a method in which, in a state where the terminal does not separately stop the run TAT, when the terminal transitions from an RRC_IDLE state or an RRC_INACTIVE state to an RRC CONNECTED state, if the TAT is run, the terminal stops the relevant TAT. In this embodiment, before operation 1e-33, in which the terminal transmits a random access preamble for a transition to a CONNECTED state, in operation 1e-31, or before the terminal receives a RAR to the relevant random access preamble, the terminal may stop the TAT and may apply TA received through the RAR when the terminal performs random access for initial access.

Figure 1F:
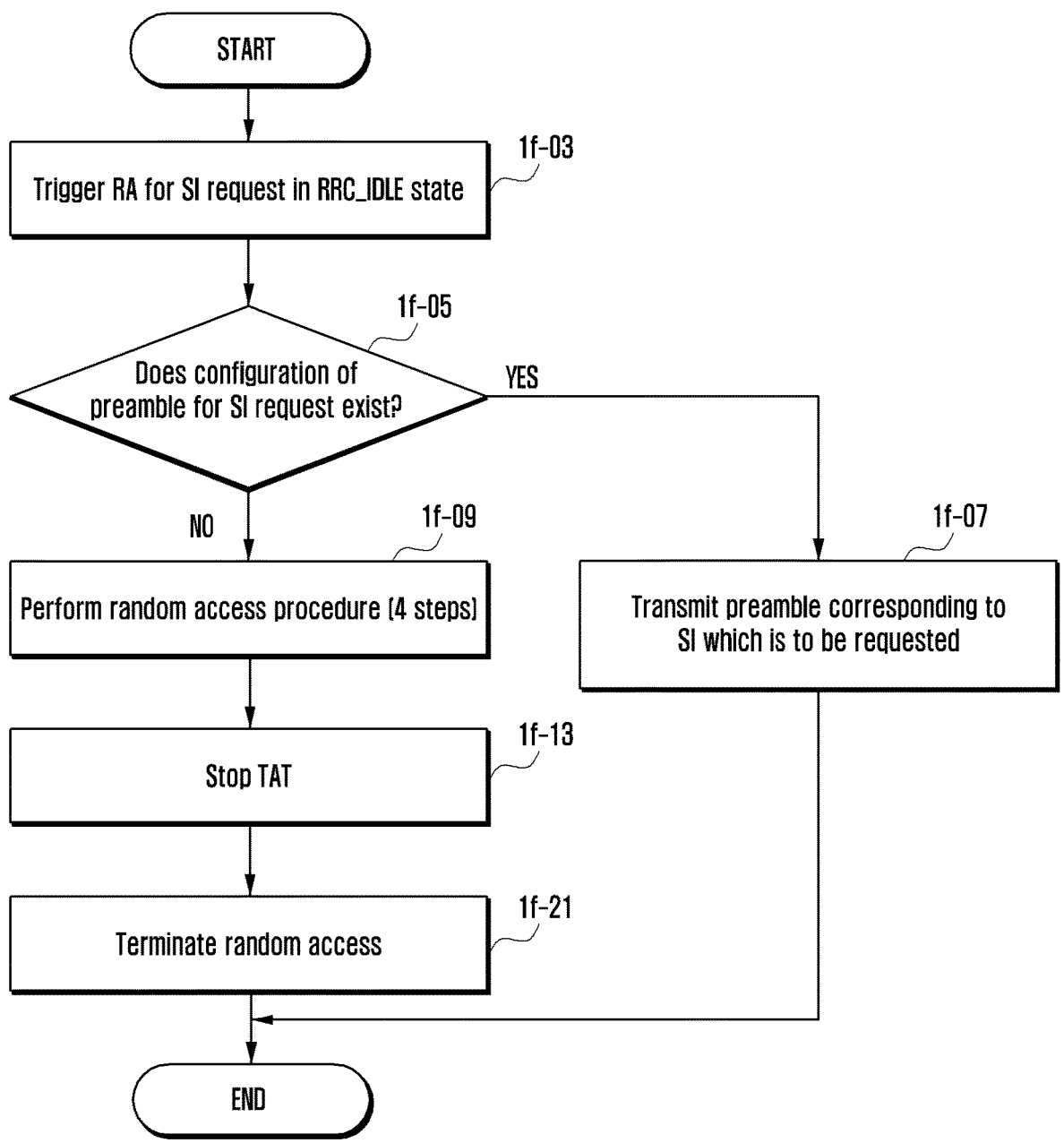
FIG. 1F is a flowchart illustrating an operation of a terminal according to an embodiment of the disclosure.

FIG. 1F is a flowchart illustrating an operation of a terminal according to an embodiment of the disclosure.

Referring to FIG. 1F, in operation 1f-03, the terminal in an RRC_IDLE state or an RRC_INACTIVE state may transmit a random access preamble on a PRACH resource in order to request SI.

In operation 1f-05, the terminal determines whether a base station configures a dedicated preamble for each SI. When the base station configures a dedicated preamble for each SI, in operation 1f-07, the terminal transmits a relevant preamble corresponding to SI which is to be requested.

Then, in operation 1f-21, the terminal may receive an RAR, which includes the transmitted preamble or only an index (RAPID) of the preamble, (e.g., a MAC sub-header or an RRC message) as a response to the request, and may terminate the random access. According to the request, the terminal may receive SI.

However, when the base station does not configure a dedicated preamble for each SI, in operation 1f-09, the terminal performs the random access procedure as described above with reference to FIG. 1E.

That is, the terminal transmits a randomly-selected random access preamble, and receives an RAR thereto and then runs a TAT. Then, if Msg4 is successfully received, the terminal stops the run TAT, in operation 1f-13, by using one method among the following methods.

According to an embodiment, the terminal transmits an HARQ ACK message for the successfully-received Msg4 and then stops the TAT. Therefore, the terminal may transmit an HARQ ACK and may notify the base station of the reception of the Msg4.

According to another embodiment, after the reception of the Msg4, the terminal stops the TAT run in the previous operation after as much delay as value of a parameter included in SI or a predetermined value defined by the standard. The predetermined value may be determined by the terminal in consideration of an HARQ retransmission delay (e.g., which is equal to 40 ms if consideration is given to up to five retransmissions when a HARQ retransmission delay of 8 ms is taken into account).

According to still another embodiment, in a state where the terminal does not separately stop the run TAT, when the terminal transitions from an RRC_IDLE state or an RRC_INACTIVE state to an RRC CONNECTED state, if the TAT is run, the terminal stops the relevant TAT. In this embodiment, before the terminal transmits a random access preamble for a transition to a CONNECTED state, or before the terminal receives an RAR to the relevant random access preamble, the terminal may stop the TAT, and the terminal may apply TA received through the RAR when the terminal performs random access for initial access.

Therefore, the base station may receive an HARQ ACK for the transmitted Msg4, and the terminal may receive the requested SI from the base station.

Figure 1G:
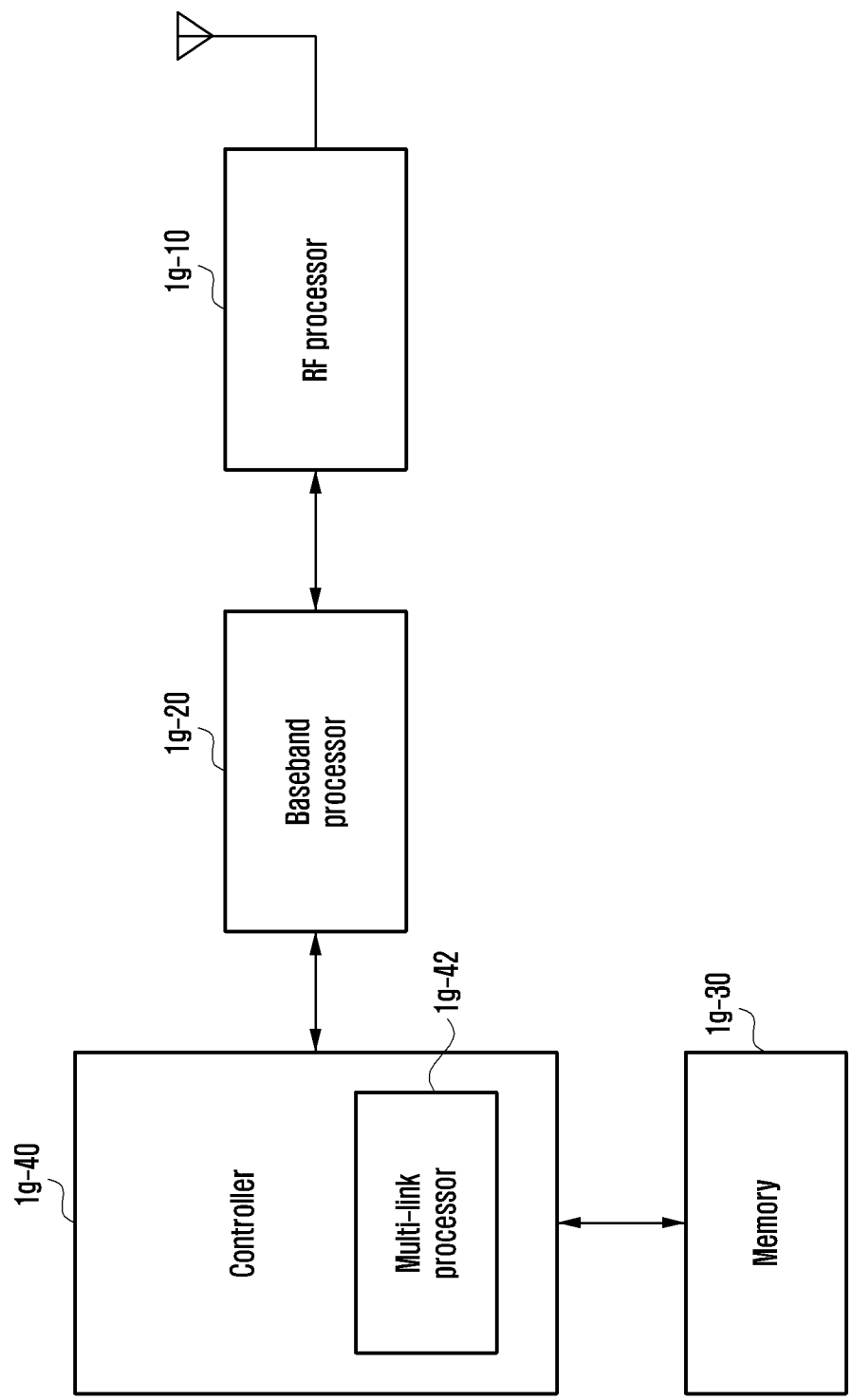
FIG. 1G is a block diagram illustrating a configuration of a terminal in a wireless communication system according to an embodiment of the disclosure.

FIG. 1G is a block diagram illustrating a configuration of a terminal in a wireless communication system according to an embodiment of the disclosure.

Referring to FIG. 1G, the terminal includes a radio frequency (RF) processor 1g-10, a baseband processor 1g-20, a memory 1g-30, and a controller 1g-40. The RF processor 1g-10 serves to transmit or receive a signal through a wireless channel, such as band conversion and amplification of a signal. That is, the RF processor 1g-10 up-converts a baseband signal provided by the baseband processor 1g-20 into an RF band signal and then transmits the RF band signal through an antenna and down-converts an RF band signal received through the antenna into a baseband signal. For example, the RF processor 1g-10 may include a transmission filter, a reception filter, an amplifier, a mixer, an oscillator, a digital-to-analog converter (DAC), an analog-to-digital converter (ADC), or the like. FIG. 1G illustrates only one antenna but the terminal may be provided with multiple antennas. Also, the RF processor 1g-10 may include multiple RF chains. Further, the RF processor 1g-10 may perform beamforming. For the beamforming, the RF processor 1g-10 may adjust a phase and a magnitude of each of the signals transmitted or received through multiple antennas or antenna elements.

The baseband processor 1g-20 performs a conversion function between a baseband signal and a bit stream according to a physical layer standard of a system. For example, when data is transmitted, the baseband processor 1g-20 generates complex symbols by encoding and modulating a transmission bit stream. Further, when data is received, the baseband processor 1g-20 reconstructs a received bit stream by demodulating and decoding the baseband signal provided by the RF processor 1g-10. For example, according to an OFDM scheme, when data is transmitted, the baseband processor 1g-20 generates complex symbols by encoding and modulating a transmission bit stream, maps the complex symbols to subcarriers, and then performs an inverse fast Fourier transform (IFFT) operation and a CP insertion to configure OFDM symbols. Further, when data is received, the baseband processor 1g-20 divides the baseband signal provided by the RF processor 1g-10 in an OFDM symbol unit, reconstructs the signals mapped to the subcarriers by a fast Fourier transform (FFT) operation, and then reconstructs a received bit stream by the modulation and decoding.

The baseband processor 1g-20 and the RF processor 1g-10 transmit and receive a signal as described above. Therefore, the baseband processor 1g-20 and the RF processor 1g-10 may be referred to as a "transmitter," a "receiver," a "transceiver," or a "communication unit." Further, at least one of the baseband processor 1g-20 and the RF processor 1g-10 may include multiple communication modules in order to support multiple different radio access technologies. Further, at least one of the baseband processor 1g-20 and the RF processor 1g-10 may include different communication modules in order to process signals in different frequency bands. For example, different radio access technologies may include a wireless LAN (e.g., IEEE 802. 11), a cellular network (e.g., LTE), or the like. Further, the different frequency bands may include a super high frequency (SHF) (e.g., 2.5 GHz and 5 GHz) band and a millimeter wave (e.g., 60 GHz) band.

The memory 1g-30 stores data such as basic programs, application programs, and configuration information for an operation of the terminal. In particular, the memory 1g-30 may store information related to a wireless LAN node that performs wireless communication by using the wireless LAN access technology. Further, the memory 1g-30 provides the stored data according to a request of the controller 1g-40.

The controller 1g-40 controls overall operations of the terminal. For example, the controller 1g-40 transmits or receives a signal through the baseband processor 1g-20 and the RF processor 1g-10. Further, the controller 1g-40 records and reads data in and from the memory 1g-30. To this end, the controller 1g-40 may include at least one processor. For example, the controller 1g-40 may include a communication processor configured to perform a control for communication and an application processor (AP) configured to control a higher layer such as an application program. According to an embodiment, the controller 1g-40 includes a multi-link processor 1g-42 configured to perform the processing for an operation in a multi-link mode. For example, the controller 1g-40 may control the terminal to perform the procedure illustrated in FIG. 1E.

When random access is performed in an RRC_IDLE state in order to request SI, the controller 1g-40 according to an embodiment controls to stop a TAT after transmission of a HARQ ACK for Msg4 is finished.

Figure 1H:
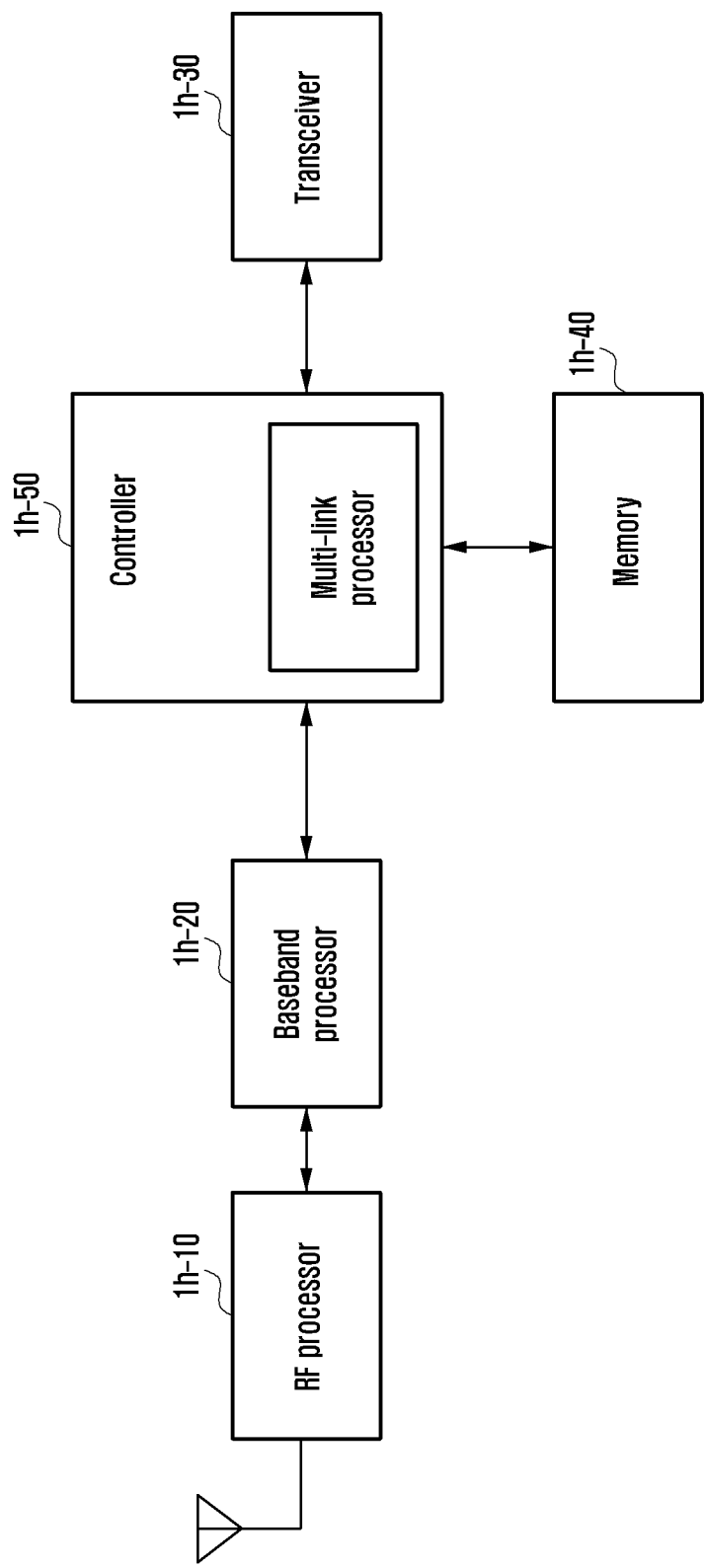
FIG. 1H is a block diagram illustrating a configuration of a base station according to an embodiment of the disclosure.

FIG. 1H is a block diagram illustrating a configuration of a base station according to an embodiment of the disclosure.

Referring to FIG. 1H, the base station includes an RF processor 1h-10, a baseband processor 1h-20, a backhaul transceiver 1h-30, a memory 1h-40, and a controller 1h-50.

The RF processor 1h-10 serves to transmit or receive a signal through a wireless channel, such as band conversion and amplification of a signal. That is, the RF processor 1h-10 up-converts a baseband signal provided by the baseband processor 1h-20 into an RF band signal and then transmits the RF band signal through an antenna and down-converts an RF band signal received through the antenna into a baseband signal. For example, the RF processor 1h-10 may include a transmission filter, a reception filter, an amplifier, a mixer, an oscillator, a DAC, an ADC, or the like. FIG. 1H illustrates only one antenna but the first access node may be provided with multiple antennas. Also, the RF processor 1h-10 may include multiple RF chains. Further, the RF processor 1h-10 may perform beamforming. For the beamforming, the RF processor 1h-10 may adjust a phase and a magnitude of each of the signals transmitted or received through multiple antennas or antenna elements. The RF processor 1h-10 may be configured to transmit one or more layers for a downlink MIMO operation.

The baseband processor 1h-20 performs a conversion function between a baseband signal and a bit stream according to a physical layer standard of first radio access technology. For example, when data is transmitted, the baseband processor 1h-20 generates complex symbols by encoding and modulating a transmission bit stream. Further, when data is received, the baseband processor 1h-20 reconstructs a received bit stream by demodulating and decoding the baseband signal provided by the RF processor 1h-10. For example, according to an OFDM scheme, when data is transmitted, the baseband processor 1h-20 generates complex symbols by encoding and modulating a transmission bit stream, maps the complex symbols to subcarriers, and then performs an IFFT operation and a CP insertion to configure OFDM symbols. Further, when data is received, the baseband processor 1h-20 divides the baseband signal provided by the RF processor 1h-10 in an OFDM symbol unit, reconstructs the signals mapped to the subcarriers by a FFT operation, and then reconstructs a received bit stream by the modulation and decoding. The baseband processor 1h-20 and the RF processor 1h-10 transmit and receive signals as described above. Accordingly, the baseband processor 1h-20 and the RF processor 1h-10 may be referred to as a "transmitter," a "receiver," a "transceiver," a "communication unit," or a "wireless communication unit."

The backhaul transceiver 1h-30 provides an interface for communication with other nodes in a network. That is, the backhaul transceiver 1h-30 converts a bit stream to be transmitted from the primary base station to another node, for example, an auxiliary base station and a core network, into a physical signal and converts a physical signal received from another node to a bit stream.

The memory 1h-40 stores data such as basic programs, application programs, and configuration information for an operation of the primary base station. In particular, the memory 1h-40 may store information on the bearers allocated to accessed terminals, measurement results reported by the accessed terminals, and the like. Also, the memory 1h-40 may store the information which becomes a standard of determination of whether to provide or stop providing multi-link to a terminal. Further, the memory 1h-40 provides the stored data according to a request of the controller 1h-50.

The controller 1h-50 controls overall operations of the primary base station. For example, the controller 1h-50 transmits or receives a signal through the baseband processor 1h-20 and the RF processor 1h-10, or through the backhaul transceiver 1h-30. Further, the controller 1h-50 records and reads data in and from the memory 1h-40. To this end, the controller 1h-50 may include at least one processor. For example, the controller 1h-50 may control the base station to perform the procedure illustrated in FIG. 1E.

Second Embodiment

Figure 2A:
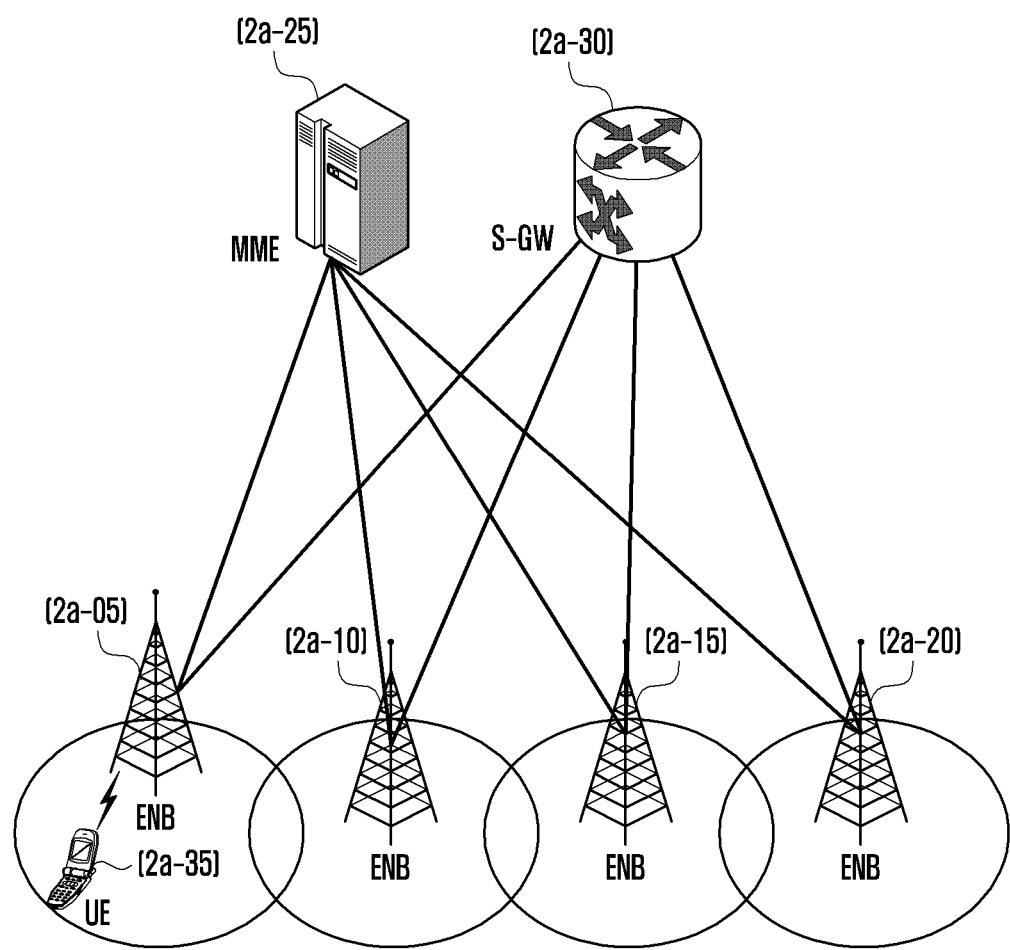
FIG. 2A is a view illustrating an architecture of an LTE system according to an embodiment of the disclosure.

FIG. 2A is a view illustrating an architecture of an LTE system according to an embodiment of the disclosure.

Referring to FIG. 2A, the wireless communication system includes base stations 2a-05, 2a-10, 2a-15, and 2a-20, an MME 2a-25, and an S-GW 2a-30. A user equipment (hereinafter a "UE" or a "terminal") 2a-35 is connected to an external network through the base stations 2a-05, 2a-10, 2a-15, and 2a-20 and the S-GW 2a-30.

The base stations 2a-05, 2a-10, 2a-15, and 2a-20 are access nodes of a cellular network and provides radio access to the terminals connected to the network. That is, in order to serve traffic of users, the base stations 2a-05, 2a-10, 2a-15, and 2a-20 collect and schedule state information such as a buffer state, an available transmission power state, and a channel state of the terminals to support the connection between the terminals and the CN. The MME 2a-25 is an apparatus configured to take charge of various control functions as well as a mobility management function for a terminal and is connected to base stations, and the S-GW 2a-30 is an apparatus configured to provide a data bearer. Further, the MME 2a-25 and the S-GW 2a-30 may further perform authentication, bearer management, and the like on the terminal connected to the network and may process packets which have been received from the base stations 2a-05, 2a-10, 2a-15, and 2a-20 or are to be delivered to the base stations 2a-05, 2a-10, 2a-15, and 2a-20.

Figure 2B:
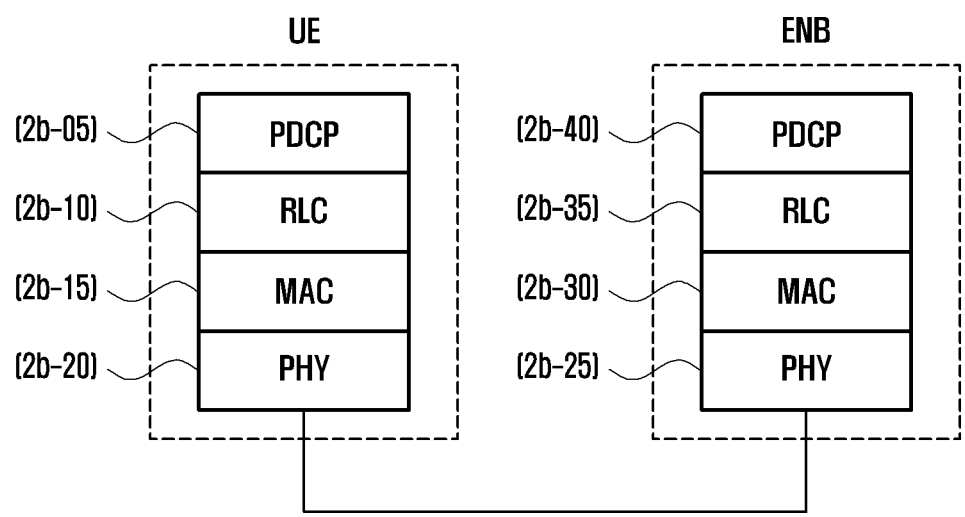
FIG. 2B is a view illustrating a wireless protocol structure in an LTE system according to an embodiment of the disclosure.

FIG. 2B is a view illustrating a wireless protocol structure in an LTE system according to an embodiment of the disclosure.

Referring to FIG. 2B, a wireless protocol of the LTE system includes PDCPs 2b-05 and 2b-40, RLCs 2b-10 and 2b-35, and MACs 2b-15 and 2b-30 in the terminal and the ENB, respectively. The PDCPs 2b-05 and 2b-40 take charge of operations such as compression/recovery of an IP header, and the RLCs 2b-10 and 2b-35 reconfigure a PDCP PDU at an appropriate size. The MACs 2b-15 and 2b-30 are connected to multiple RLC layer devices configured in one terminal and perform an operation of multiplexing RLC PDUs in a MAC PDU and demultiplexing the RLC PDUs from the MAC PDU. Physical layers 2b-20 and 2b-25 perform an operation of channel-coding and modulating higher layer data, making the higher layer data as an OFDM symbol and transmitting the same to a radio channel, or demodulating and channel-decoding an OFDM symbol received through the radio channel and delivering the demodulated and channel-decoded OFDM symbol to the higher layer. Further, even the physical layer uses an HARQ for additional error correction, and a receiving end transmits whether to receive a packet transmitted by a transmitting end by 1 bit. This is called "HARQ ACK/NACK information." Downlink HARQ ACK/NACK information on uplink transmission may be transmitted through a PHICH physical channel, and uplink HARQ ACK/NACK information on downlink transmission may be transmitted through a PUCCH or PUSCH physical channel.

Although not illustrated in the drawings, RRC layers exist at an upper part of the PDCP layer of the terminal and the base station, and the RRC layer may receive and transmit access-and-measurement-related configuration control messages for radio resource control.

Figure 2C:
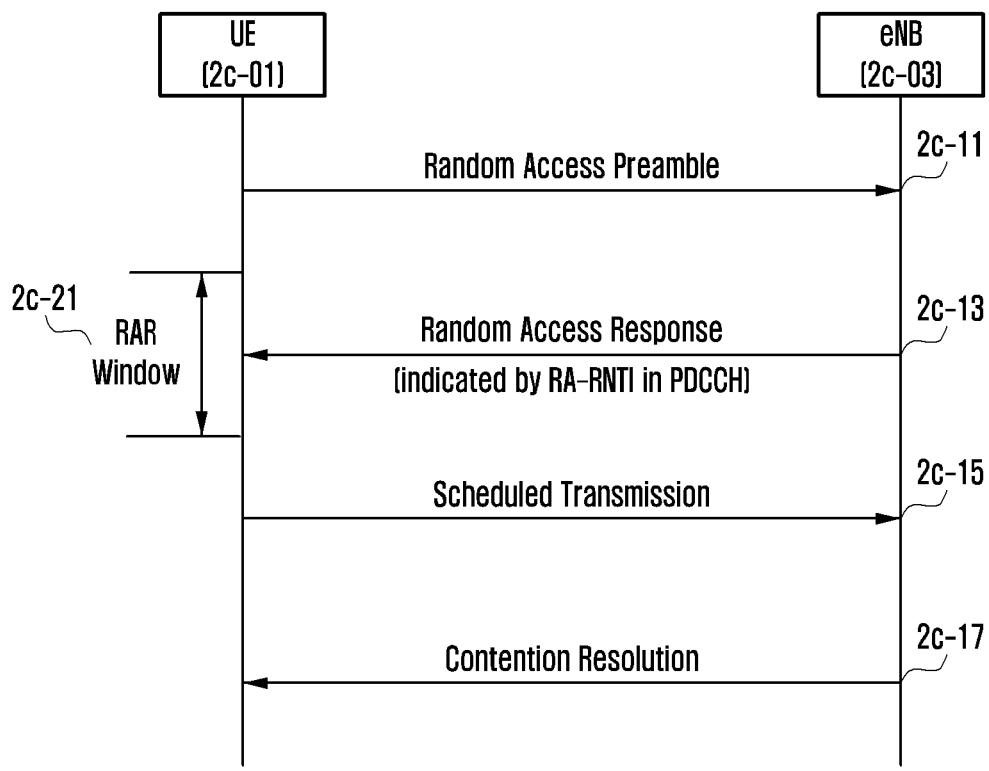
FIG. 2C is a signal flow diagram illustrating a random access procedure according to an embodiment of the disclosure.

FIG. 2C is a signal flow diagram illustrating a random access procedure according to an embodiment of the disclosure. Since a similar procedure and similar terms are also used in a 5G system to which the disclosure is applied, in order to help the understanding of the disclosure, the relevant procedure will be briefly described.

Referring to FIG. 2C, in various cases where a terminal 2c-01 needs initial access, re-access, a handover, and further, random access to a base station, the terminal 2c-01 performs random access by performing the following procedure.

First, in operation 2c-11, the terminal 2c-01 transmits a random access preamble through a physical channel for random access in order to access a base station 2c-03. The physical channel may be referred to as a "PRACH" in the LTE system, and one or more terminals may simultaneously transmit random access preambles through a resource of the relevant PRACH. Also, the random access preamble is a particular sequence designed to be received even before the base station is completely synchronized with the terminal, and multiple preamble identifiers (indices) may exist according to standards. If multiple preamble indices exist, the preamble transmitted by the terminal may be a preamble that the terminal has randomly selected, or may be a particular preamble designated by the base station.

If the base station receives the preamble, in operation 2c-13, the base station may transmit an RAR message to the received preamble to the terminal. The RAR message may include index information of the preamble used in operation 2c-11, uplink transmission timing correction information, uplink resource allocation information to be used in subsequent operations (i.e., operation 2c-15 and an Msg3 transmission operation), temporary terminal identifier information, and the like.

The index information of the preamble is transmitted so as to provide notification of to which preamble the RAR message, which is a response message, responds, for example, when multiple terminals transmit different preambles and thus attempt random accesses in operation 2c-11.

The uplink resource allocation information is information on a resource that the terminal is to use to transmit Msg3 in operation 2c-15, and may include, for example, a physical position and a physical size of the resource, a modulation and coding scheme used during transmission of Msg3, and power adjustment information during transmission of Msg3.

Since, if the terminal having transmitted a preamble initially accesses the base station, the terminal does not have an identifier that the base station has assigned for communication with the base station, the temporary terminal identifier information is value transmitted so as to allow the terminal to use to communicate with the base station.

The RAR message should be transmitted within a predetermine interval after a predetermined period of time from a time point at which the terminal transmits the preamble, and the interval is referred to as a "RAR window" 2c-21. Also, when the RAR message is transmitted, the base station may schedule the relevant RAR message through a PDCCH, and relevant scheduling information may be scrambled using a RA-RNTI.

The RA-RNTI is mapped to the PRACH resource used to transmit the message in operation 2c-11, and the terminal, which has transmitted a preamble through a particular PRACH resource, attempts to receive a PDCCH based on a relevant RA-RNTI so as to determine whether a corresponding RAR message exists.

In operation 2c-15, the terminal having received the RAR message may transmit different messages for various purposes, according to uplink resource allocation information included in the RAR message. In the diagram illustrated as an example, the message is a thirdly-transmitted message and may be referred to as an "Msg3" (i.e., the preamble in operation 2c-11 may be referred to as an "Msg1" and the RAR in operation 2c-13 may be referred to as an "Msg2").

As examples of the Msg3 transmitted by the terminal: in the case of initial access, the terminal may transmit an RRCConnectionRequest message which is a message of an RRC layer; in the case of re-access, the terminal may transmit an RRCConnectionReestablishmentRequest message; and during a handover, the terminal may transmit an RRCConnectionReconfigurationComplete message. Alternatively, a BSR message for resource request and the like may transmitted as the Msg3.

Then, in operation 2c-17, if the terminal performs initial transmission (i.e., if Msg3 does not include base station identifier information pre-allocated to the terminal), the terminal may receive a contention resolution message from the base station, and the contention resolution message includes, without any change, the contents, which the terminal has transmitted through the Msg3. Therefore, even when multiple terminals have selected the same preamble in operation 2c-11, it is possible to provide notification of to which terminal the contention resolution message responds.

Figure 2D:
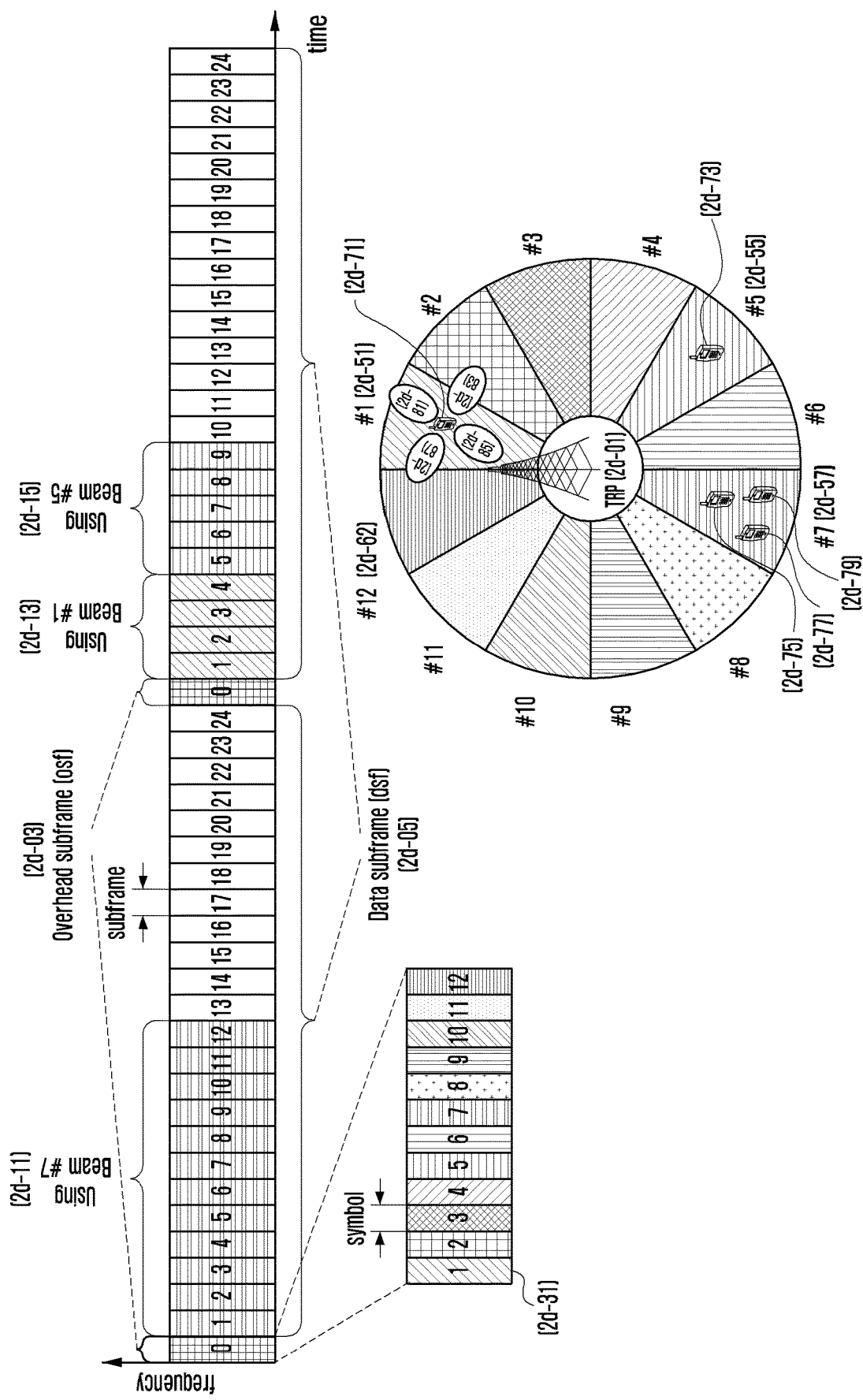
FIG. 2D is a view illustrating an example of a frame structure used in a 5G system according to an embodiment of the disclosure.

FIG. 2D is a view illustrating an example of a frame structure used in a 5G system according to an embodiment of the disclosure.

For the 5G system, consideration may be given to a scenario in which the 5G system operates at a high frequency so as to ensure a high transmission rate and a wide frequency bandwidth, and a scenario in which it is difficult to deliver a signal at a high frequency and thus data is transmitted through a beam.

Referring to FIG. 2D, therefore, consideration may be given to a scenario in which different beams are used for communication when a base station or a transmission reception point (hereinafter a "TRP") 2d-01 communicates with terminals 2d-71, 2d-73, 2d-75, 2d-77, and 2d-79 in a cell. That is, in FIG. 2D illustrated as an example, consideration is given to a scenario in which a terminal 1 2d-71 performs communication by using a beam #1 2d-51, a terminal 2 2d-73 performs communication by using a beam #5 2d-55, and a terminal 3 2d-75, a terminal 4 2d-77, and a terminal 5 2d-79 perform communication by using a beam #7 2d-57.

In order to measure which beam a terminal uses to communicate with the TRP, an overhead subframe (osf) 2d-03 exists temporally, and the base station may transmit a reference signal by using respective different beams according to symbols (or over multiple symbols) in the osf 2d-03. In FIG. 2D illustrated as example, it is assumed that 12 beams #1 2d-51 to #12 2d-62 are transmitted by the base station and beam sweeping is configured such that different beams used for different symbols are transmitted in an osf. That is, respective beams are transmitted for symbols (e.g., the beam #1 2d-51 is transmitted in the first symbol 2d-31) in an osf and thus, through measurement of the osf, the terminal can measure that a signal from which beam among the beams transmitted in the osf has the largest strength.

In FIG. 2D illustrated as an example, a scenario in which the relevant osf is repeated at intervals of 25 subframes is assumed and the remaining 24 subframes are data subframes (dsfs) 2d-05 in which general data is transmitted or received.

Consideration is given to a scenario in which: according to scheduling of the base station, the terminal 3 2d-75, the terminal 4 2d-77, and the terminal 5 2d-79 perform communication by commonly using the beam #7 (as indicated by reference numeral 2d-11); the terminal 1 2d-71 performs communication by using the beam #1 (as indicated by reference numeral 2d-13); and the terminal 2 2d-73 performs communication by using the beam #5 (as indicated by reference numeral 2d-15).

In FIG. 2D illustrated as an example, although the transmission beams #1 2d-51 to #12 2d-62 of the base station are schematized, additional consideration may be given to reception beams of a terminal (e.g., reception beams 2d-81, 2d-83, 2d-85, and 2d-87 of the terminal 1 2d-71) for receiving the transmission beams #1 2d-51 to #12 2d-62 of the base station. In FIG. 2D illustrated as an example, the terminal 1 has the four beams 2d-81, 2d-83, 2d-85, and 2d-87 and performs beam sweeping in order to determine which beam provides the best reception performance. In this example, if multiple beams cannot be simultaneously used, the terminal receives multiple osfs by the number of the reception beams in such a manner as to use one reception beam for each osf, and thus can find an optimal transmission beam of the base station and an optimal reception beam of the terminal.

Figure 2E:
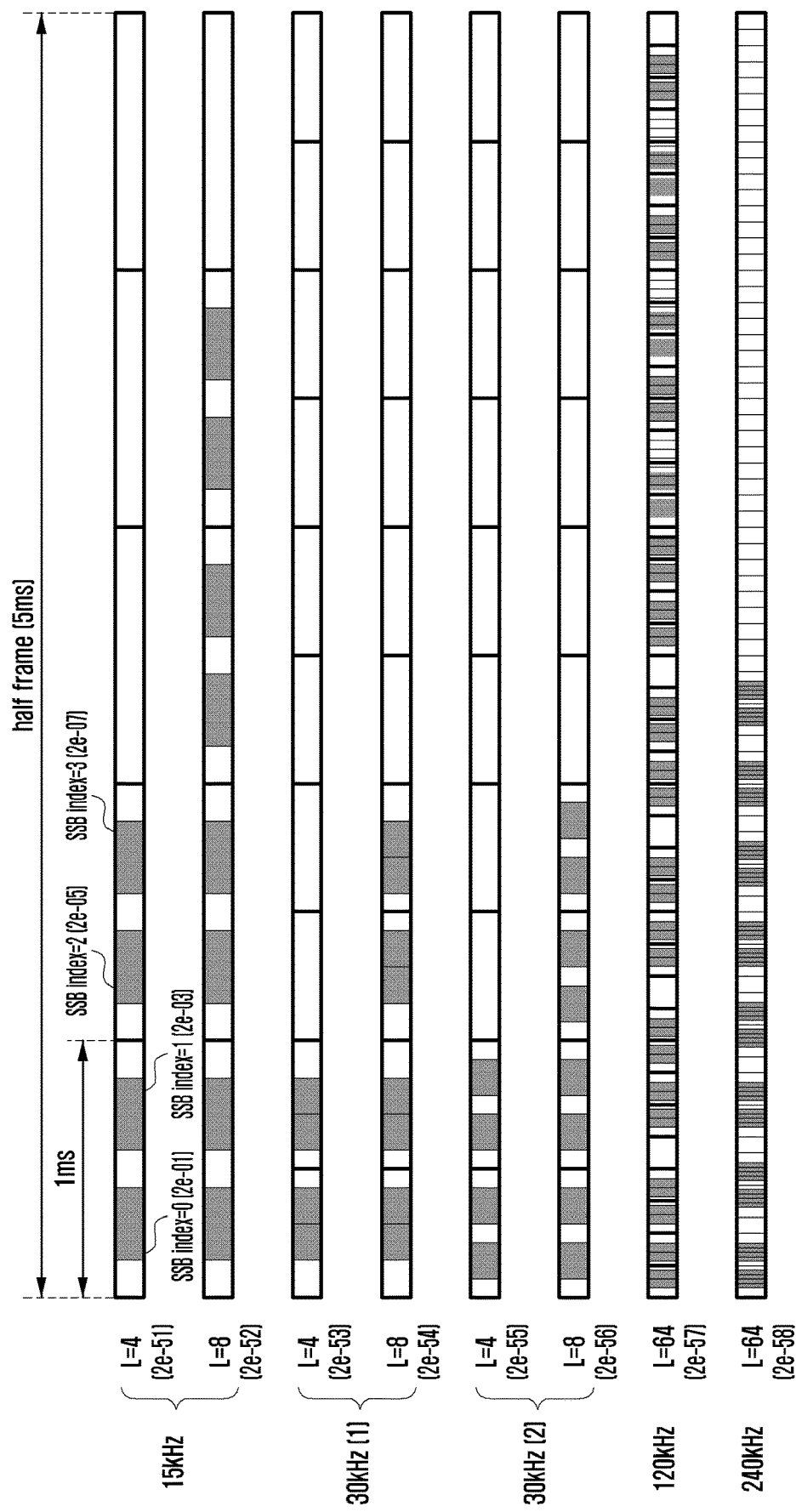
FIG. 2E is a view schematizing a position of a synchronization signal block (SSB) in a frame structure of new radio (NR) to which the disclosure is applied according to an embodiment of the disclosure.

FIG. 2E is a view schematizing a position of an SSB in a frame structure of NR to which the disclosure is applied according to an embodiment of the disclosure.

Referring to FIG. 2E, in the NR system, the osf described above with reference to FIG. 2D is embodied by transmission of an SSB. The SSB is a set including: a primary synchronization signal (PSS) and a secondary synchronization signal (SSS) which are transmitted to allow terminals to be synchronized with a timing when transmission is performed by a base station; and master information block (MIB) which is minimum system information necessary to access a base station. The SSB has an index different for each beam, and SSBs may be respectively transmitted through a maximum of four beams within 5 ms in an example (as indicated by reference numerals 2e-01, 2e-03, 2e-05, and 2e-07). A maximum of four beams are supported, but if the base station operates only one beam, only one SSB may be transmitted (e.g., one of the SSBs indicated by reference numerals 2e-01, 2e-03, 2e-05, and 2e-07). That is, the marked parts in FIG. 2E represent transmissions of SSBs.

An NR system may: have a maximum of four SSB indices if a center operating frequency is lower than or equal to 3 GHz (i.e., for L=4, as indicated by reference numerals 2e-51, 2e-53, and 2e-55); have a maximum of eight SSB indices if a center operating frequency is higher than or equal to 3 GHz and is lower than or equal to 6 GHz (i.e., for L=8, as indicated by reference numerals 2e-52, 2e-54, and 2e-56); and have a maximum of 64 SSB indices if a center operating frequency is higher than or equal to 6 GHz (as indicated by reference numerals 2e-57 and 2e-58).

Also, in FIG. 2E, SSB(s) may be transmitted in a period of 5 ms, and the period in which SSB(s) is transmitted may be repeated at every cycle of 5/10/20/40/80/160 ms. If a half frame is repeated at every cycle of 10 ms, the half frame having the period of 5 ms, in which SSB(s) is/are transmitted as illustrated in FIG. 2E illustrated as an example, is repeated at every cycle of 10 ms.

Further, the NR system operates such that a system frame is repeated at every cycle of 10 ms, and each system frame has a system frame number (SFN). In order to measure a neighboring cell, the terminal should detect a boundary of the system frame. This configuration is needed for the terminal to detect a position at which SSB(s) is/are transmitted. That is, if the terminal detects a boundary timing of the system frame, the terminal may recognize a configuration (e.g., as indicated by reference numeral 2e-51) in which an SSB is transmitted, based on a center operating frequency of a relevant cell (e.g., which is higher than or equal to 3 GHz, or is lower than or equal to 3 GHz) and information on a frequency band to which the relevant center operating frequency belongs (e.g., only a subcarrier spacing (SCS) of 15 kHz/30 kHz is allowed for the relevant frequency band). Therefore, the terminal may receive an SSB at the relevant position.

In order to identify the boundary of the system frame, the terminal should receive a half-frame index (i.e., a value indicating 5 ms of a front half or a rear half of the system frame of 10 ms duration) that the base station transmits in a state of being included in the SSB, and should also receive an SSB index (e.g., in order to recognize which SSB is indicated among the SSBs indicated by reference numerals 2e-01, 2e-03, 2e-05, and 2e-07). For example, when the base station transmits only an SSB index=0 according to the configuration indicated by reference numeral 2e-51, if the terminal detects an SSB in order to measure the relevant cell and identifies, from the relevant SSB, that an SSB index is 0 and an HFI is 0, the terminal may detect the position (as indicated by reference numeral 2e-01) of an SSB in 5 ms of the front half in the system frame of the relevant base station so as to delimit the boundary of the system frame of 10 ms duration, thereby performing measurement.

A signal transmitted to indicate HFI becomes different according to a center operating frequency of the base station. For example, if a center operating frequency is lower than or equal to 3 Hz, HFI is transmitted in a state of being encoded in a demodulation reference signal (DMRS) of a physical broadcast channel (PBCH) including an MIB. If a center operating frequency is higher than or equal to 3 Hz, HFI is included in a transport block (TB) in which an MIB is transmitted (i.e., the terminal should decode the contents of a PBCH in order to acquire HFI from the base station having the center frequency higher than or equal to 3 GHz).

Further, if a center operating frequency is lower than or equal to 6 GHz, information on the SSB index is also encoded in a DMRS of a PBCH. In contrast, if a center operating frequency is higher than or equal to 6 GHz, only when the terminal decodes not only a DMRS of a PBCH but also the contents of a TB of the PBCH, the terminal may acquire information on the SSB index. That is, in some cases, only if an MIB is completely received, the terminal may acquire the above-described pieces of information.

When the terminal measures neighboring cells, this configuration may become a burden on the terminal. For example, this is because, if the terminal does not have any timing information of neighboring cells to be measured, the terminal may measure the neighboring cells only when the terminal receives all MIBs of signals of base stations at frequencies to be measured.

In addition, when the terminal in a connected-mode state is handed over to another base station, a similar problem may occur. In particular, in the case of random access in a beam-based system, a random access channel is connected to the SSB, and thus the terminal may transmit a preamble to a random access channel related to an SSB selected by the terminal, according to the relevant SSB. Therefore, the base station may determine which SSB the terminal has selected, and thus may perform transmission by using a beam corresponding to the selected SSB when an RAR message is transmitted.

Further, when the terminal receives a handover command from a previous base station, the terminal may receive information on a random access channel mapped to an SSB index related to a base station to be handed over to. However, when the terminal performs a handover, after the terminal is synchronized with the base station to be handed over to, the terminal needs information on an SSB index in order to identify which of SSBs transmitted by the relevant base station has the best signal quality. That is, as in the above-described example, if a DMRS of a PBCH is received or only if the contents of a TB of a PBCH are decoded, the terminal may acquire the above-described information.

In addition, in order to subsequently perform random access to a random access channel mapped to the corresponding SSB index, the terminal should decode all MIBs of the received SSBs. Information on the random access channel is configured according to SFN information and the SFN information is transmitted in a state of being included in a MIB in a PBCH. Therefore, in order to detect a boundary of a system frame and an SFN corresponding to the relevant system frame, only if the terminal decodes all MIBs of the received SSBs, the terminal may recognize where the terminal can perform random access.

A position at which an HFI/SSB index/SFN according to the above-described various configurations is transmitted may be summarized as shown Table 1 below.

TABLE 1

|  | FR1 (<3 G) | FR1 (>3 G) | FR2 |
|---|---|---|---|
| PBCH DMRS | HFI<br>SSB index<br>2 bits | SSB index<br>3 bits | SSB index<br>LSB 3 bits |
| PBCH TB | — | HFI | HFI<br>SSB index<br>MSB 3 bit |
| PBCH MIB | | SFN LSB 4 bits<br>SFN MSB 6 bits | |

Therefore, if the terminal does not have any timing information of a cell that the terminal is to measure, the terminal has a burden in that the terminal should decode even MIB information in an SSB (i.e., PBCH DMRS/TB/MIB are all decoded). If timing information of a cell, in which the terminal is currently located, is identical to timing information of a cell that the terminal is to measure (e.g., if boundaries of system frames of respective base station are all synchronized using GPS), without having to decode MIB information of the base station that the terminal is to be measured, the terminal may detect at which position an SSB is transmitted, using a timing of the current base station, and may measure only signal strengths and signal qualities of a PSS and an SSS of an SSB transmitted at the relevant position, and thus the measurement complexity and a measurement delay of the terminal can be significantly reduced.

To this end, for example, for cells at relevant frequencies or a particular cell, the base station may configure an indicator useServingCellTimingForSync for providing notification that synchronization of a serving cell, which the terminal is currently connected to or camps on, can be used as it is.

Further, with respect to each marked position in FIG. 2E at which an SSB can be transmitted, the base station may indicate whether an SSB is actually transmitted by the relevant cell (ssb-PositionsInBurst). For example, the configuration of reference numeral 2e-51 includes positions at which a total of four SSBs can be transmitted, and if an SSB is transmitted at only first position among the positions, whether an SSB is transmitted at the corresponding position may be indicated using a binary number such as "1000."

If the base station indicates, to the terminal, both useServingCellTimingForSync (e.g., which is set to "True") and ssb-PositionsInBurst (e.g., which is set to "1000"), during measurement of a cell at a corresponding frequency, without having to decode an MIB of the relevant cell, the terminal may measure signal strength/quality of the relevant cell by measuring only a PSS and an SSS of an SSB transmitted at the position indicated by reference numeral 2e-01, according to a timing of a current serving cell.

Figure 2F:
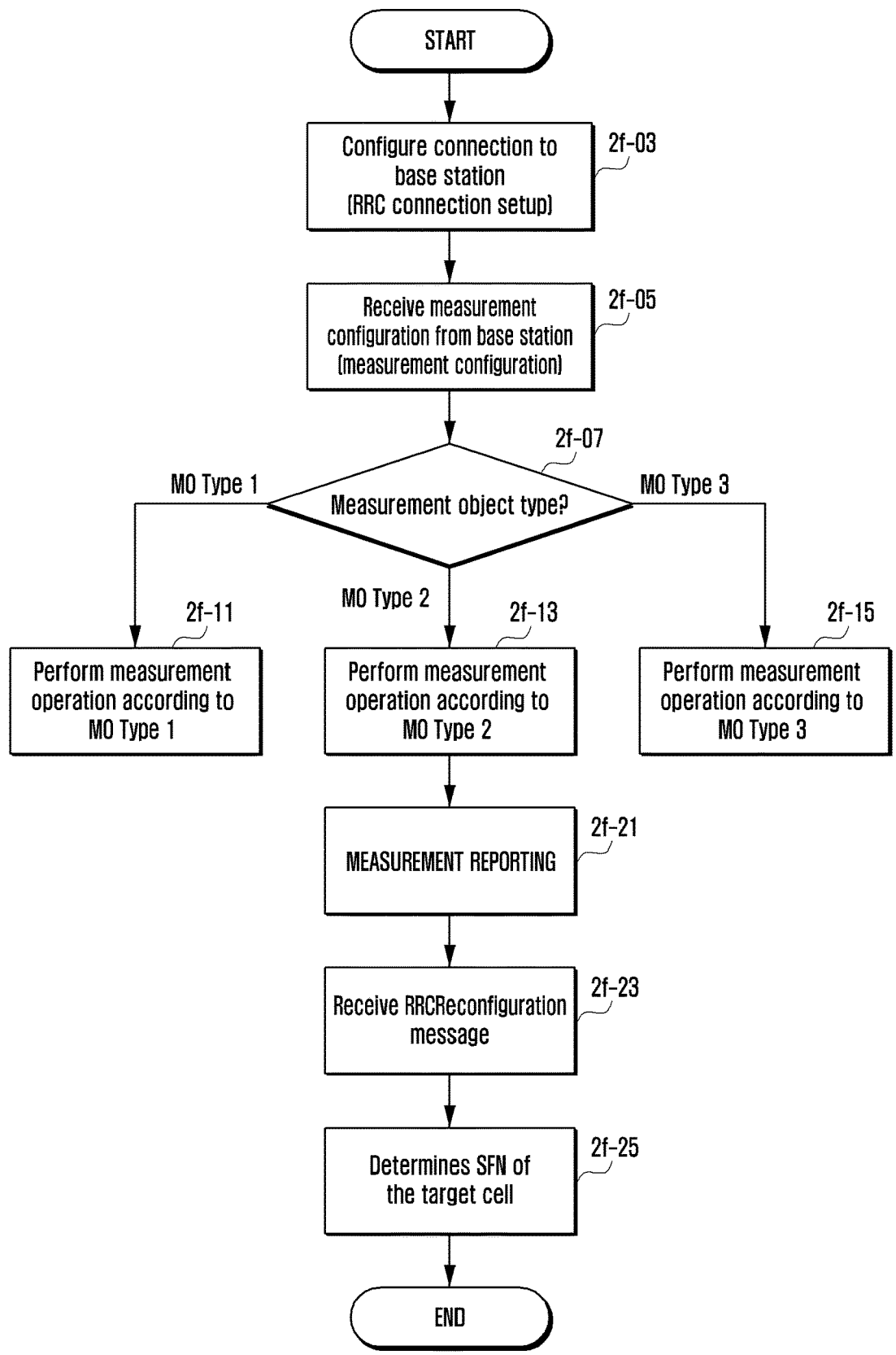
FIG. 2F is a flowchart illustrating an operation of a terminal in a connected-mode state when the terminal performs a handover according to an embodiment of the disclosure.

FIG. 2F is a flowchart illustrating an operation of a terminal in a connected-mode state when the terminal performs a handover according to an embodiment of the disclosure.

Referring to FIG. 2F, in operation 2f-03, the terminal in an idle state or an inactive state performs random access to a base station, and performs a connection request procedure in order to transition to a connected mode.

The terminal, which has been successfully connected to the base station, may transmit or receive data to or from the relevant base station. In operation 2f-05, the terminal may receive configuration information for measuring a neighboring base station or a neighboring cell, from the base station to which the terminal is connected. For example, if the terminal moves, the base station may transmit the configuration information to the terminal in order to hand over the terminal to a neighboring base station.

The measurement configuration information may include, for each frequency and each cell, at least one piece of information among center frequency information (an absolute radio frequency channel number (ARFCN)) of a measurement object (MO), SCS information of a relevant frequency, and information such as the above-described useServingCellTimingForSync and ssb-PositionsInBurst.

Accordingly, in operation 2f-07, the terminal determines to which MO type the relevant frequency belongs.

MO Type 1: if UseServingCellTimingForSync is set to "True" or is included and a frequency of an MO is equal to a frequency at which the terminal currently operates (i.e., which is equal to a frequency of a representative cell (PCell or PSCell, which is collectively referred to as an "SpCell" and definition of which is described in 3GPP TS 38.331) or an additional (SCell, definition of which is described in 3GPP TS 38.331) cell in a connected state).

MO Type 2: if UseServingCellTimingForSync is set to "True" or is included and a frequency of an MO is not equal to a frequency at which the terminal currently operates.

MO Type 3: if UseServingCellTimingForSync is set to "False" or UseServingCellTimingForSync is not included.

In the case of MO Type 1, when the terminal measures a neighboring cell of a configured MO, the terminal assumes that a boundary (including an OFDM) of a system frame of a relevant cell is synchronized with a timing of a serving cell (an SpCell or SCell) or a PCell having the same frequency as that of the configured MO with reference to the timing, and thus may measure a signal strength or a signal quality of an SSB of each cell at a relevant frequency. In operation 2f-11, if ssb-PositionsInBurst information is included, the terminal may measure only a corresponding signal according to corresponding bitmap information.

In the case of MO Type 2, when the terminal measures a neighboring cell of a configured MO, the terminal assumes that a boundary (including an OFDM) of a system frame of a relevant cell is synchronized with a timing of a PCell with reference to the timing, and thus may measure a signal strength or a signal quality of an SSB of each cell at a relevant frequency. In operation 2f-13, if ssb-PositionsInBurst information is included, the terminal may measure only a corresponding signal according to corresponding bitmap information.

According to another embodiment, in the case of MO Type 2, when the terminal measures a neighboring cell of a configured MO, the terminal may select a reference cell of the configured MO, may decode an SSB of the reference cell, and then may determine boundaries (including OFDMs) of system frames of MO cells configured according to corresponding information. Then, the terminal may measure a signal strength or a signal quality of an SSB of each cell at a relevant frequency according to the boundaries of the system frames determined for all the cells within the relevant MO. In operation 2f-13, if ssb-PositionsInBurst information is included, the terminal may measure only a corresponding signal according to corresponding bitmap information.

In the case of MO Type 3, when the terminal measures a neighboring cell of a configured MO, the terminal receives an SSB for each cell so as to determine a boundary of a frame of a relevant cell as described above with reference to FIG. 2E, and thus determines a position of a transmitted SSB, thereby measuring each SSB. Further, the terminal identifies an actual start position (an OFDM symbol) of an SSB (e.g., one piece of information among the pieces of information indicated by reference numerals 2e-51 to 2e-58 in FIG. 2E) according to information of a band, to which an operating frequency of the configured MO belongs, and an SCS value. In operation 2f-15, if ssb-PositionsInBurst information is included, the terminal may measure only a corresponding signal according to corresponding bitmap information.

Then, in operation 2f-21, the terminal performs cell-specific measurement of the configured MO, and periodically performs reporting according to a configuration of the base station, or transmits a report message on a measurement result if a reporting condition is satisfied.

Then, in operation 2f-23, according to the report result, the terminal may perform a handover to a particular base station from the base station, or may receive a configuration message (RRCReconfiguration message) from the base station in order to enable measurement of a PSCell of a secondary Node B for configuration of dual-base station technology.

In the NR system, in the case of the above-described scenario, a configuration message received from the base station may include ReconfigWithSync information. In this example, the configuration message may include an identifier (physical cell identifier (PCI)), useServingCellTimingForSync, ssb-PositionsInBurst, ARFCN, and SCS information of a cell to which a handover is to be performed or which is to be added to a PSCell.

Then, in operation 2f-25, the terminal should perform random access to a configured cell, and to this end, should determine an SFN of the relevant cell. If useServingCellTimingForSync is set to "True" or is included for useServingCellTimingForSync information received in operation 2f-23 or a frequency at which the relevant cell has been configured as an MO before operation 2f-23, the terminal may determine an SFN of the relevant cell on the assumption of the same SFN as that of the previous cell, and thus may measure an SSB and may perform random access to a random access channel mapped to the relevant SSB.

However, if useServingCellTimingForSync is set to "False" or is not included for useServingCellTimingForSync information received in operation 2f-23 or a frequency at which the relevant cell has been configured as an MO before operation 2f-23, the terminal may: decode even an MIB in an SSB (i.e., PBCH DMRS/TB/MIB are all decoded) transmitted by the relevant cell so as to determine an SFN; measure SSBs, transmitted by the relevant cell, according to the determination of an SFN; and perform random access to a random access channel mapped to an SSB satisfying a condition (i.e., an SSB having a signal strength greater than a threshold configured by the base station) among the measured SSBs. Accordingly, the terminal may add a handover or a PSCell by performing random access to the relevant cell.

Figure 2G:
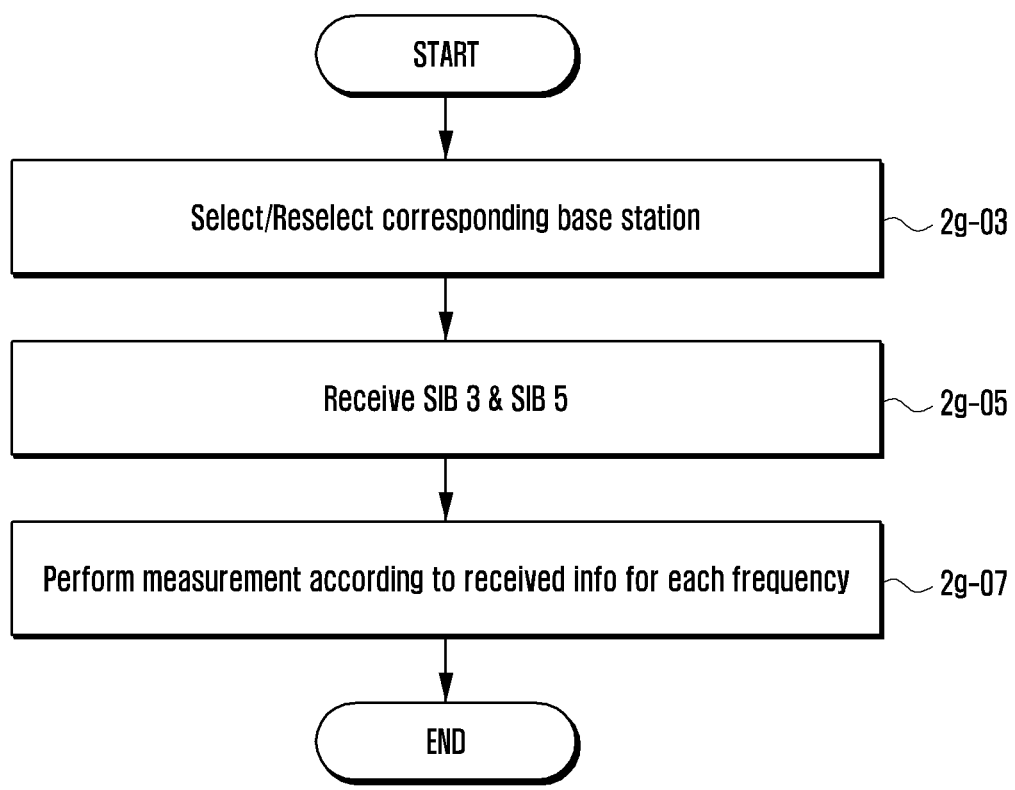
FIG. 2G is a flowchart illustrating an operation of a terminal in an idle mode or an inactive state when the terminal reselects and measures a neighboring cell according to an embodiment of the disclosure.

FIG. 2G is a flowchart illustrating an operation of a terminal in an idle mode or an inactive state when the terminal reselects and measures a neighboring cell according to an embodiment of the disclosure.

As described above with reference to FIG. 2F, the base station does not separately lay a handover command and the like on a terminal in an idle mode or an inactive state, and the relevant terminal may autonomously move to a base station according to SI transmitted by the base station.

Referring to FIG. 2G, to this end, if the terminal is powered on, and scans a neighboring cell so as to select or reselect a neighboring cell by using a method defined by the TS 38.304 standard in operation 2g-03, the terminal receives SI from the selected or reselected neighboring cell. The SI may be transmitted through an SIB message of an RRC layer. In operation 2g-05, the terminal may receive an intra-frequency measurement-related SIB (SIB 3 in LTE) and an inter-frequency measurement-related SIB (SIB 5 in LTE), and through the SIB, the terminal may identify useServingCellTimingForSync and ssb-PositionsInBurst information of a frequency for intra-frequency measurement, and may identify frequency information ARFCN, and useServingCellTimingForSync and ssb-PositionsInBurst information of the relevant frequency which correspond to an MO for inter-frequency measurement.

Then, in operation 2g-07, the terminal may perform intra-frequency measurement and inter-frequency measurement based on the received information.

More specifically, in the case of intra-frequency measurement, if useServingCellTimingForSync of information in the received SIB is set to "True" or is included, the terminal may measure a neighboring cell with reference to a timing of the currently selected/reselected cell according to MO Type 1 as described above with reference to FIG. 2F.

Also, in the case of intra-frequency measurement, if useServingCellTimingForSync of information in the received SIB is set to "False" or is not included, the terminal decodes an SSB of each neighboring cell according to MO Type 3 as described above with reference to FIG. 2F so as to detect a position of the SSB and perform measurement.

In the case of inter-frequency measurement, if useServingCellTimingForSync of information in the received SIB is set to "True" or is included, the terminal may measure a neighboring cell with reference to a timing of the currently selected or reselected cell according to MO Type 2 as described above with reference to FIG. 2F, or may select a reference cell at the relevant frequency so as to determine a timing according to the contents of a relevant SSB and then may measure a neighboring cell.

Further, in the case of inter-frequency measurement, if useServingCellTimingForSync of information in the received SIB is set to "False" or is not included, the terminal decodes an SSB of each neighboring cell according to MO Type 3 as described above with reference to FIG. 2F so as to detect a position of the SSB and perform measurement.

Figure 2H:
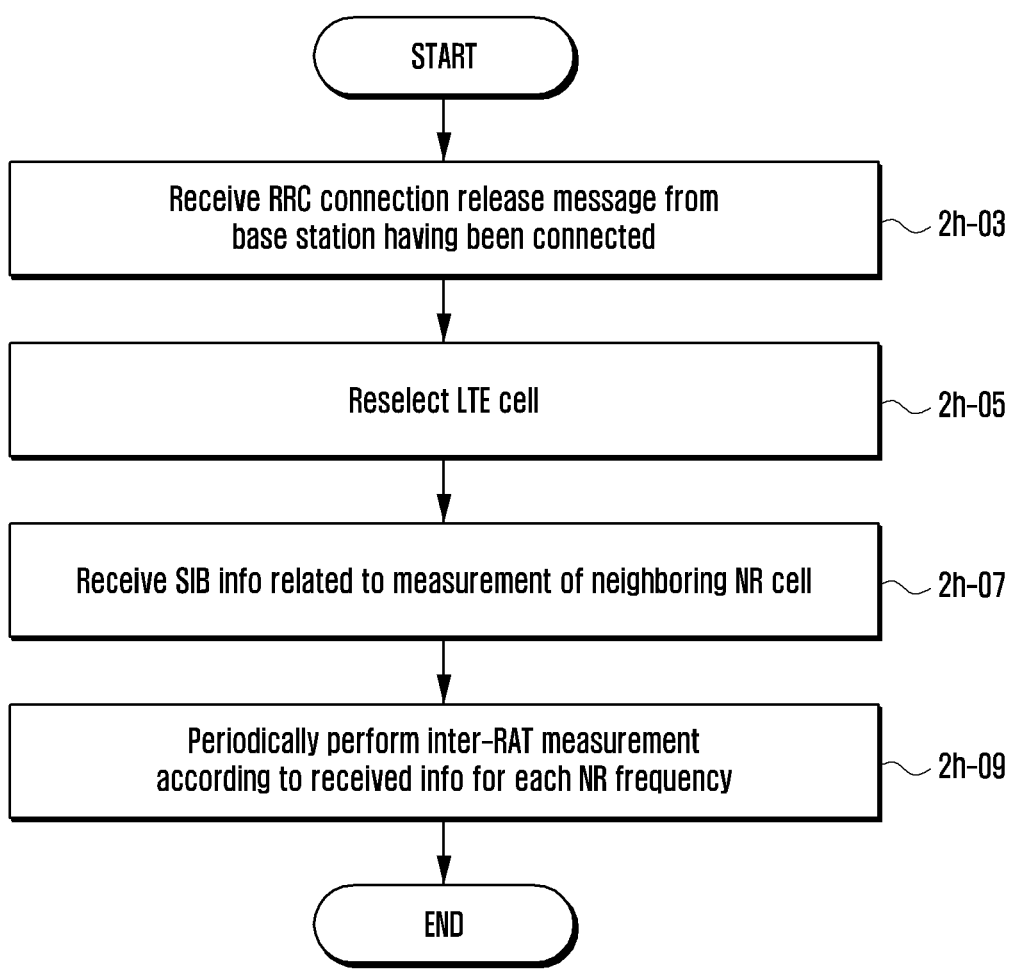
FIG. 2H is a flowchart illustrating an operation of a terminal in an idle mode when the terminal measures a new radio (NR) neighboring cell in an LTE according to an embodiment of the disclosure.

FIG. 2H is a flowchart illustrating an operation of a terminal in an idle mode when the terminal measures an NR neighboring cell in an LTE according to an embodiment of the disclosure.

Referring to FIG. 2H, in operation 2h-03, consideration may be given to a scenario in which a terminal connected to a base station receives a connection release command message from the base station so as to transition to an RRC_IDLE state (an idle state). Accordingly, the terminal receives a connection release command message from the base station, the RRC connection release command message may include priority-related information on an NR frequency and an LTE frequency (i.e., cell reselection priority for LTE frequency and cell reselection priority for NR frequency) in a subsequent idle state, and the priority-related information may be used when the terminal reselects a cell in an idle state.

Then, in operation 2h-05, consideration may be given to a scenario in which the terminal selects an LTE cell according to the received information and SI transmitted by a currently-reselected cell. In operation 2h-07, the terminal receives an SIB from a reselected LTE cell, and the SIB may include not only measurement configuration information for selection of an LTE neighboring cell but also measurement configuration information for selection of an NR neighboring cell. Configuration information on an NR neighboring cell transmitted by the LTE cell may include useSameTimingForSync, ssb-PositionsInBurst, and an ARFCN which is the relevant NR frequency information.

Then, in operation 2h-09, the terminal periodically performs inter-RAT (heterogeneous communication technology, that is, an NR cell) measurement in an LTE cell.

More specifically, if useServingCellTimingForSync of the relevant NR frequency is set to "True" or is included in configuration information in the received SIB, the terminal may measure a neighboring cell with reference to a timing of the currently selected or reselected cell according to MO Type 2 described above with reference to FIG. 2F, or may select a reference cell at the relevant frequency so as to determine a timing according to the contents of a relevant SIB and then may measure a neighboring cell. This method may be implemented in that a system frame has a length of 10 ms in both LTE and NR.

Further, if useServingCellTimingForSync of the relevant NR frequency is set to "False" or is not included in configuration information in the received SIB, the terminal decodes an SSB of each neighboring cell according to MO Type 3 described above with reference to FIG. 2F so as to detect a position of the SSB and perform measurement.

Figure 2I:
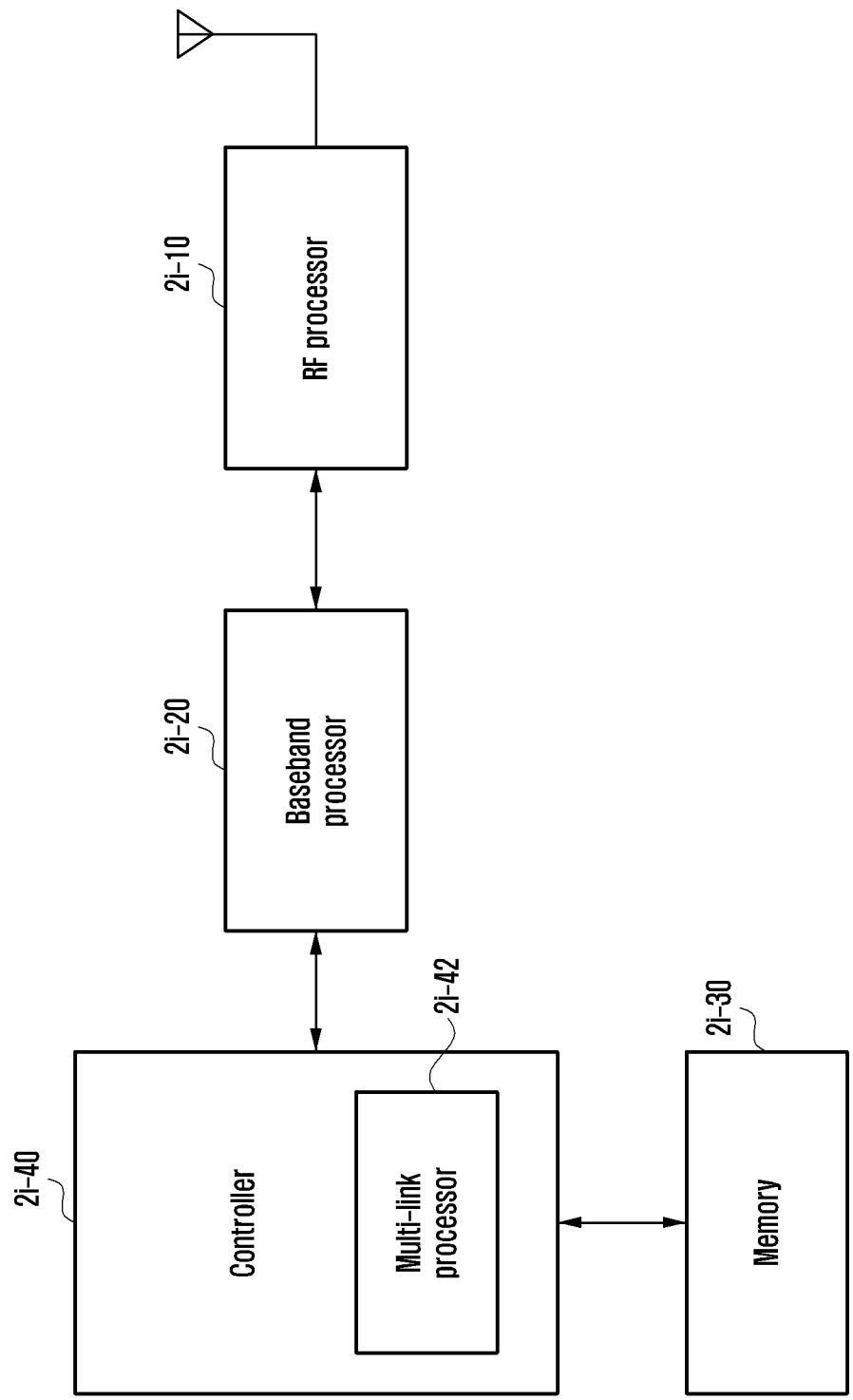
FIG. 2I is a block diagram illustrating a configuration of a terminal according to an embodiment of the disclosure.

FIG. 2I is a block diagram illustrating a configuration of a terminal according to an embodiment of the disclosure.

Referring to FIG. 2I, the terminal includes a radio frequency (RF) processor 2i-10, a baseband processor 2i-20, a memory 2i-30, and a controller 2i-40.

The RF processor 2i-10 serves to transmit or receive a signal through a wireless channel, such as band conversion and amplification of a signal. That is, the RF processor 2i-10 up-converts a baseband signal provided by the baseband processor 2i-20 into an RF band signal and then transmits the RF band signal through an antenna and down-converts an RF band signal received through the antenna into a baseband signal. For example, the RF processor 2i-10 may include a transmission filter, a reception filter, an amplifier, a mixer, an oscillator, a DAC, an ADC, or the like. FIG. 2I illustrates only one antenna but the terminal may be provided with multiple antennas. Also, the RF processor 2i-10 may include multiple RF chains. Further, the RF processor 2i-10 may perform beamforming. For the beamforming, the RF processor 2i-10 may adjust a phase and a magnitude of each of the signals transmitted or received through multiple antennas or antenna elements.

The baseband processor 2i-20 performs a conversion function between a baseband signal and a bit stream according to a physical layer standard of a system. For example, when data is transmitted, the baseband processor 2i-20 generates complex symbols by encoding and modulating a transmission bit stream. Further, when data is received, the baseband processor 2i-20 reconstructs a received bit stream by demodulating and decoding the baseband signal provided by the RF processor 2i-10. For example, according to an OFDM scheme, when data is transmitted, the baseband processor 2i-20 generates complex symbols by encoding and modulating a transmission bit stream, maps the complex symbols to subcarriers, and then performs an IFFT operation and a CP insertion to configure OFDM symbols. Further, when data is received, the baseband processor 2i-20 divides the baseband signal provided by the RF processor 2i-10 in an OFDM symbol unit, reconstructs the signals mapped to the subcarriers by an FFT operation, and then reconstructs a received bit stream by the modulation and decoding.

The baseband processor 2i-20 and the RF processor 2i-10 transmit and receive a signal as described above. Therefore, the baseband processor 2i-20 and the RF processor 2i-10 may be referred to as a "transmitter," a "receiver," a "transceiver," or a "communication unit." Further, at least one of the baseband processor 2i-20 and the RF processor 2i-10 may include different communication modules in order to process signals in different frequency bands. The different frequency bands may include an SHF (e.g., 2.5 GHz and 5 GHz) band and a millimeter wave (e.g., 60 GHz) band.

The memory 2i-30 stores data such as basic programs, application programs, and configuration information for an operation of the terminal.

The controller 2i-40 controls overall operations of the terminal. For example, the controller 2i-40 transmits or receives a signal through the baseband processor 2i-20 and the RF processor 2i-10. Further, the controller 2i-40 records and reads data in and from the memory 2i-30. To this end, the controller 2i-40 may include at least one processor. For example, the controller 2i-40 may include a communication processor configured to perform a control for communication and an application processor (AP) configured to control a higher layer such as an application program. According to an embodiment, the controller 2i-40 includes a multi-link processor 2i-42 configured to perform the processing for an operation in a multi-link mode. For example, the controller 2i-40 may control the terminal to perform the operation of the terminal illustrated in FIG. 2F.

According to an embodiment, when a cell is measured according to information received from a base station, the controller 2i-40 of the terminal determines whether to receive all MIBs of the relevant cell, and performs measurement according to a determination result.

Figure 2J:
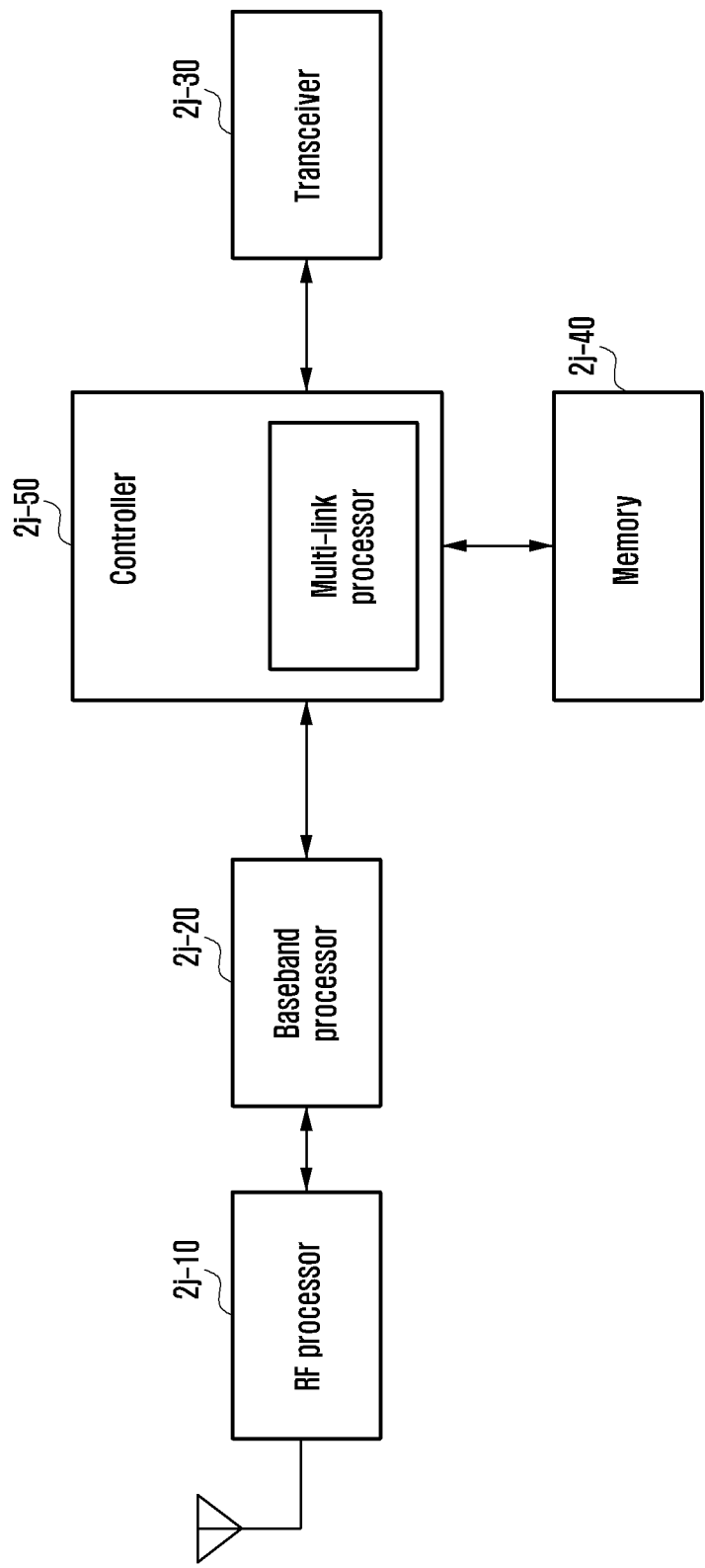
FIG. 2J is a block diagram illustrating a configuration of a base station according to an embodiment of the disclosure.

FIG. 2J is a block diagram illustrating a configuration of a base station according to an embodiment of the disclosure.

Referring to FIG. 2J, the base station includes an RF processor 2j-10, a baseband processor 2j-20, a backhaul transceiver 2j-30, a memory 2j-40, and a controller 2j-50.

The RF processor 2j-10 serves to transmit or receive a signal through a wireless channel, such as band conversion and amplification of a signal. That is, the RF processor 2j-10 up-converts a baseband signal provided by the baseband processor 2j-20 into an RF band signal and then transmits the RF band signal through an antenna and down-converts an RF band signal received through the antenna into a baseband signal. For example, the RF processor 2j-10 may include a transmission filter, a reception filter, an amplifier, a mixer, an oscillator, a DAC, an ADC, or the like. FIG. 2J illustrates only one antenna but the first access node may be provided with multiple antennas. Also, the RF processor 2j-10 may include multiple RF chains. Further, the RF processor 2j-10 may perform beamforming. For the beamforming, the RF processor 2j-10 may adjust a phase and a magnitude of each of the signals transmitted or received through multiple antennas or antenna elements. The RF processor 2j-10 may be configured to transmit one or more layers for a downlink MIMO operation.

The baseband processor 2j-20 performs a conversion function between a baseband signal and a bit stream according to a physical layer standard of first radio access technology. For example, when data is transmitted, the baseband processor 2j-20 generates complex symbols by encoding and modulating a transmission bit stream. Further, when data is received, the baseband processor 2j-20 reconstructs a received bit stream by demodulating and decoding the baseband signal provided by the RF processor 2j-10. For example, according to an OFDM scheme, when data is transmitted, the baseband processor 2j-20 generates complex symbols by encoding and modulating a transmission bit stream, maps the complex symbols to subcarriers, and then performs an IFFT operation and a CP insertion to configure OFDM symbols. Further, when data is received, the baseband processor 2j-20 divides the baseband signal provided by the RF processor 2j-10 in an OFDM symbol unit, reconstructs the signals mapped to the subcarriers by an FFT operation, and then reconstructs a received bit stream by the modulation and decoding. The baseband processor 2j-20 and the RF processor 2j-10 transmit and receive signals as described above. Accordingly, the baseband processor 2j-20 and the RF processor 2j-10 may be referred to as a "transmitter," a "receiver," a "transceiver," a "communication unit," or a "wireless communication unit."

The backhaul transceiver 2j-30 provides an interface for communication with other nodes in a network. That is, the backhaul transceiver 2j-30 converts a bit stream to be transmitted from the primary base station to another node, for example, an auxiliary base station and a core network, into a physical signal and converts a physical signal received from another node to a bit stream.

The memory 2j-40 stores data such as basic programs, application programs, and configuration information for an operation of the primary base station. In particular, the memory 2j-40 may store information on the bearers allocated to accessed terminals, measurement results reported by the accessed terminals, and the like. Also, the memory 2j-40 may store the information which becomes a standard of determination of whether to provide or stop providing multi-link to a terminal. Further, the memory 2j-40 provides the stored data according to a request of the controller 2j-50.

The controller 2j-50 controls overall operations of the primary base station. For example, the controller 2j-50 transmits or receives a signal through the baseband processor 2j-20 and the RF processor 2j-10, or through the backhaul transceiver 2j-30. Further, the controller 2j-50 records and reads data in and from the memory 2j-40. To this end, the controller 2j-50 may include at least one processor. For example, the controller 2j-50 may control the base station to perform the procedure illustrated in FIG. 1E.

The methods according to the embodiments described in claims or specification of the disclosure may be implemented in hardware, software, or a combination of hardware and software.

When the methods are implemented in the software, a computer-readable storage medium storing at least one program (software module) may be provided. At least one programs stored in the computer-readable storage medium is configured to be executed by at least one processor within an electronic device. At least one program includes instructions that allow the electronic device to execute the methods according to the embodiments described in the claims or specification of the disclosure.

The program (software module, software) may be stored in non-volatile memories including a random access memory and a flash memory, a read only memory (ROM), an electrically erasable programmable read only memory (EEPROM), a magnetic disc storage device, a compact disc ROM (CD-ROM), digital versatile discs (DVDs) or other types of optical storage apparatuses, and a magnetic cassette. Alternatively, the programs may be stored in the memory that is configured of a combination of some or all of the memories. Further, a plurality of such memories may be included in the electronic device.

Further, the program may be stored in an attachable storage device that may be accessed through communication networks such as the Internet, an intranet, a local area network (LAN), a wide LAN (WLAN), and a storage area network (SAN) or a communication network configured in a combination thereof. The storage device may access an apparatus performing the embodiment through an external port. Further, a separate storage device on the communication network may also access the apparatus performing the embodiment.

In the drawings for description of the methods of the disclosure, the order of the description does not necessarily correspond to the order of execution, and operations may not be order-dependent or may be executed in parallel.

Alternatively, in the drawings for description of the methods of the disclosure, some elements may be omitted and only some elements may be included without departing from the essence of the disclosure.

Further, the methods of the disclosure may be executed through combination of some or all of the contents included in the respective embodiments, without departing from the essence of the disclosure.

In the detailed embodiments, elements included in the disclosure are represented by a singular number or a plural number according to the detailed embodiment as described above. However, the expressions of the singular number or the plural number are selected to meet the situations proposed for convenience of explanation and the disclosure is not limited to the single element or the plural elements, and even though the elements are represented in plural, the element may be configured in a singular number or even though the elements are represented in a singular number, the element may be configured in plural.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a terminal in a communication system, the method comprising:
   transmitting a random access preamble of random access procedure for requesting system information;
   receiving a random access response message including timing advance (TA) information;
   starting a timealignmenttimer timer related to the TA information;
   transmitting a request message for requesting the system information based on the TA information;
   receiving a response message as a response to the request message;
   transmitting a hybrid automatic repeat request (HARQ) acknowledgment (ACK) for the response message; and
   stopping the timealignmenttimer timer after the transmission of the HARQ ACK.

2. The method of claim 1, wherein the receiving of the random access response message comprises applying the TA information included in the random access response message in case that the timealignmenttimer timer is not run.

3. The method of claim 1, wherein the terminal is in an idle state or an inactive state.

4. The method of claim 3, further comprising:
   transmitting a random access preamble for initial access, after stopping the timealignmenttimer timer; and
   receiving a response message as a response to the random access preamble for initial access.

5. The method of claim 1, wherein the response message includes a contention resolution message related to the request for the system information.

6. The method of claim 1, wherein the request message includes information on the requested system information.

7. The method of claim 1, wherein the random access response message further includes uplink resource allocation information including information on a resource that the terminal is to use to transmit the request message.

8. The method of claim 7, wherein the uplink resource allocation information including a modulation and coding scheme and power adjustment information.

9. A terminal in a communication system, the terminal comprising:
   a transceiver; and
   at least one processor configured to:
      transmit a random access preamble of random access procedure for requesting system information,
      receive a random access response message including timing advance (TA) information,
      start a timealignmenttimer timer related to the TA information,
      transmit a request message for requesting the system information based on the TA information,
      receive a response message as a response to the request message,
      transmit a hybrid automatic repeat request (HARQ) acknowledgment (ACK) for the response message, and
      stop the timealignmenttimer timer after the transmission of the HARQ ACK.

10. The terminal of claim 9, wherein the at least one processor is further configured to apply the TA information included in the random access response message in case that the timealignmenttimer timer is not run.

11. The terminal of claim 9, wherein the terminal is further configured to be in an idle state or an inactive state.

12. The terminal of claim 11, wherein the at least one processor is further configured to:
   transmit a random access preamble for initial access, after stopping the timealignmenttimer timer, and
   receive a response message as a response to the random access preamble for initial access.

13. The terminal of claim 9, wherein the response message includes a contention resolution message related to the request for the system information.

14. The terminal of claim 9, wherein the request message includes information on the requested system information.

15. The terminal of claim 9, wherein the random access response message further includes uplink resource allocation information including information on a resource that the terminal is to use to transmit the request message.

16. The terminal of claim 15, wherein the uplink resource allocation information including a modulation and coding scheme and power adjustment information.

* * * * *